US007432935B2

(12) United States Patent
Keller

(10) Patent No.: US 7,432,935 B2
(45) Date of Patent: Oct. 7, 2008

(54) IMAGE SYNTHESIS METHODS AND SYSTEMS FOR GENERATING SAMPLE POINTS IN A GRAPHICS SCENE

(75) Inventor: Alexander Keller, Ulm (DE)

(73) Assignee: Mental Images GmbH, Berlin (DE)

( * ) Notice: Subject to any disclaimer, the term of this patent is extended or adjusted under 35 U.S.C. 154(b) by 0 days.

(21) Appl. No.: 11/465,717

(22) Filed: Aug. 18, 2006

(65) Prior Publication Data

US 2007/0046686 A1    Mar. 1, 2007

Related U.S. Application Data

(63) Continuation-in-part of application No. 10/299,958, filed on Nov. 19, 2002, now Pat. No. 7,167,175.

(60) Provisional application No. 60/709,173, filed on Aug. 18, 2005.

(51) Int. Cl.
G09G 5/00      (2006.01)
G06T 15/00     (2006.01)
(52) U.S. Cl. ..................... 345/581; 345/419
(58) Field of Classification Search ............... None
See application file for complete search history.

(56) References Cited

U.S. PATENT DOCUMENTS 6,028,606 A *   2/2000  Kolb et al. .................. 345/419
6,529,193 B1    3/2003  Herken et al.
7,167,175 B2 *  1/2007  Keller ........................ 345/426

FOREIGN PATENT DOCUMENTS

WO      02/03326      1/2002
WO      03/098467     11/2003

OTHER PUBLICATIONS

A. Keller. Instant Radiosity. Computer Graphics (SIGGRAPH Proceedings), 1997.*
A. Keller. A quasi-Monte Carlo Algorithm for the Global Illumination in the Radiosity Setting. Monte-Carlo and Quasi-Monte Carlo Methods in Scientific Computing, Springer 1995.*
T. Kollig and A. Keller. Efficient Multi-dimensional Sampling. Computer Graphics Forum, vol. 21, Num 3, Sep. 2002.*

(Continued)

*Primary Examiner*—Ulka Chauhan
*Assistant Examiner*—Daniel F Hajnik
(74) *Attorney, Agent, or Firm*—Jacobs & Kim LLP; David Jacobs

(57) ABSTRACT

The invention provides systems and computer-implemented methods for evaluating integrals using quasi-Monte Carlo methodologies, and in particular embodiments, adaptive quasi-Monte Carlo integration and adaptive integro-approximation in conjunction with techniques including a scrambled Halton Sequence, stratification by radical inversion, stratified samples from the Halton Sequence, deterministic scrambling, bias elimination by randomization, adaptive and deterministic anti-aliasing, anti-aliasing by rank-1 lattices, and trajectory splitting by dependent sampling and rank-1 lattices.

6 Claims, 14 Drawing Sheets

OTHER PUBLICATIONS

C. Damez, K. Dmitriev, and K. Myszkowski. Global Illumination for Interactive Applications and High-Quality Animations. Eurographics, Sep. 2002. Star.*

D. P. Mitchell. Consequences of stratified sampling in graphics. In SIGGRAPH '96: Proceedings of the 23rd annual conference on Computer graphics and interactive techniques, pp. 277-280. ACM Press, 1996.*

C. Lemieux and P. L'Ecuyer. Using lattice rules for variance reduction in simulation. In Proceedings of the 2000 Winter Simulation Conference, pp. 509-516, Piscataway, NJ, 2000. IEEE Press.*

Elise de Doncker. Methods for enhancing numerical integration. Department of Computer Science, Western Michigan University, Kalamazoo, MI 49008, USA, Available online Feb. 22, 2003.*

PCT International Search Report dated May 11, 2007 for PCT/US06/32393 (pub'd as WO 2007/022439 A3).

* cited by examiner

```
unsigned short Period, *Sigma;
void InitSigma(int n)
{
unsigned short Inverse, Digit, Bits;
Period = 1 << n;
Sigma = new unsigned short [Period];
for (unsigned short i = 0; i < Period; i++)
{
    Digit = Period
    Inverse = 0;
    for (bits = i; bits; bits >>= 1)
    {
        Digit >>= 1;
        if(Bits & 1)
            inverse += Digit;
    }
    Sigma[i] = Inverse;
}
}
void SampleSubpixel(unsigned int *i, double *x, double *y, int s_x, int s_y)
{
    int j = s_x & (Period - 1);
    int k = s_y & (Period - 1);
    *i = j * Period + Sigma[k]
    *x = (double) s_x + (double) Sigma[k] / (double) Period;
    *y = (double) s_y + (double) Sigma[j] / (double) Period;
}
```

FIG. 5

```
{
    int i; //current instance of low discrepancy vector
    int d; //current integral dimension in ray tree
    ...
}
void Shade (Ray& Ray)
{
    Ray next_ray;
    int i = ray.i;

int d = ray.d
        ...
        for (int j = 0; j < M; j++ )
        {
        ...
        // ray set up for recursion
```

$$y = \left( \Phi_{b_d}(i, \sigma_{b_d}) \oplus \frac{j}{M}, \ldots, \Phi_{b_{d+\Delta d-1}}(i, \sigma_{d_{d+\Delta d-1}}) \oplus \Phi_{b_{d+\Delta d-2}}(i, \sigma_{b_{d+\Delta d-2}}) \right)$$

```
        next_ray = SetUpRay(y); // determine ray parameters by y
        next_ray.i = I + j; // decorrelation by generalization
        next_ray.d = d + Δ; //dimension allocation
        Shade(next_ray);
        ...
    }
}
```

FIG. 6

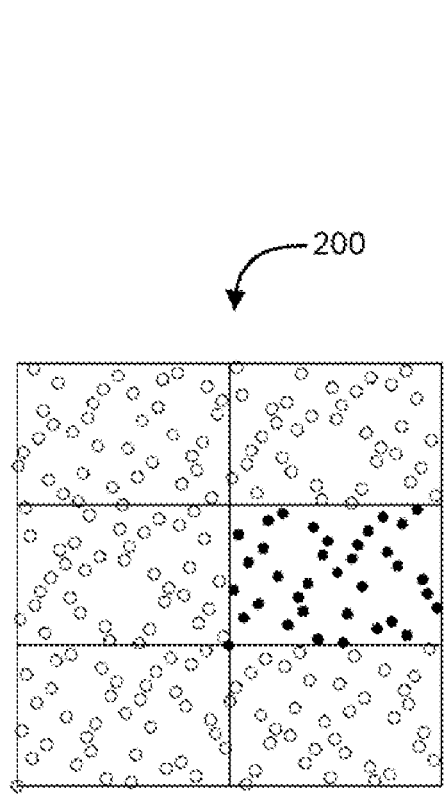
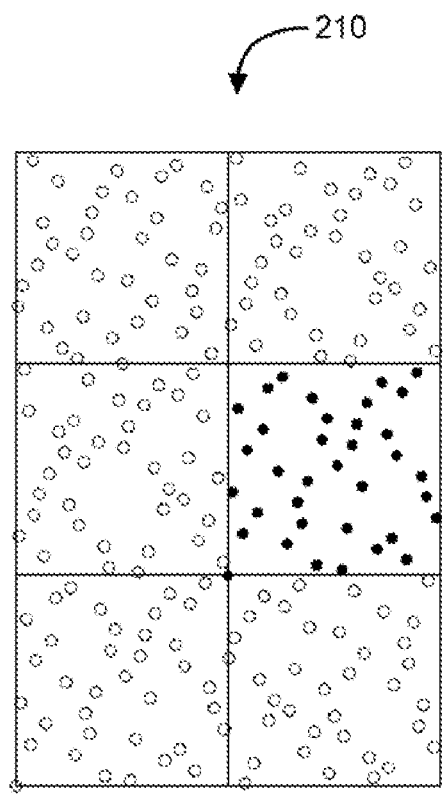
FIG. 7A                FIG. 7B
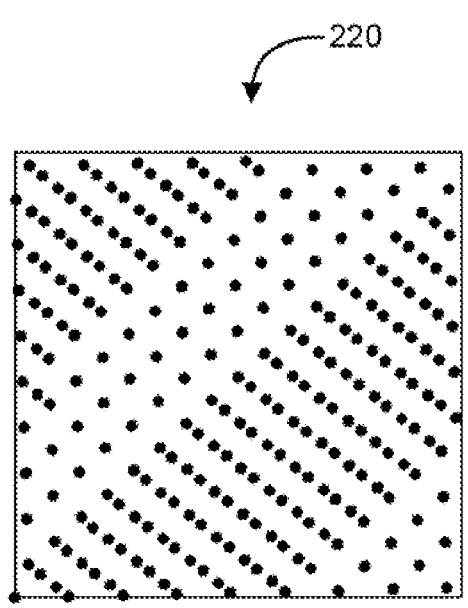
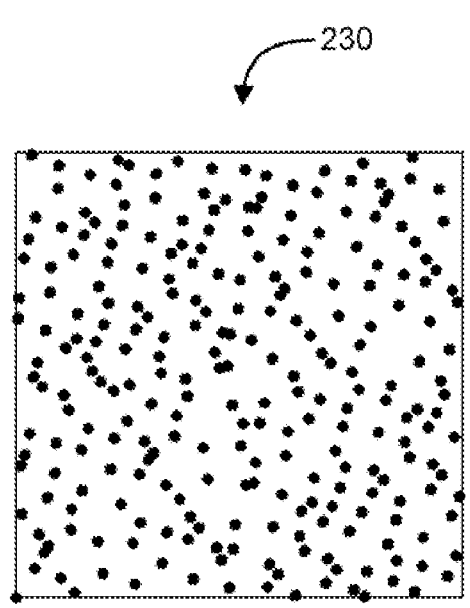
FIG. 8A                FIG. 8B

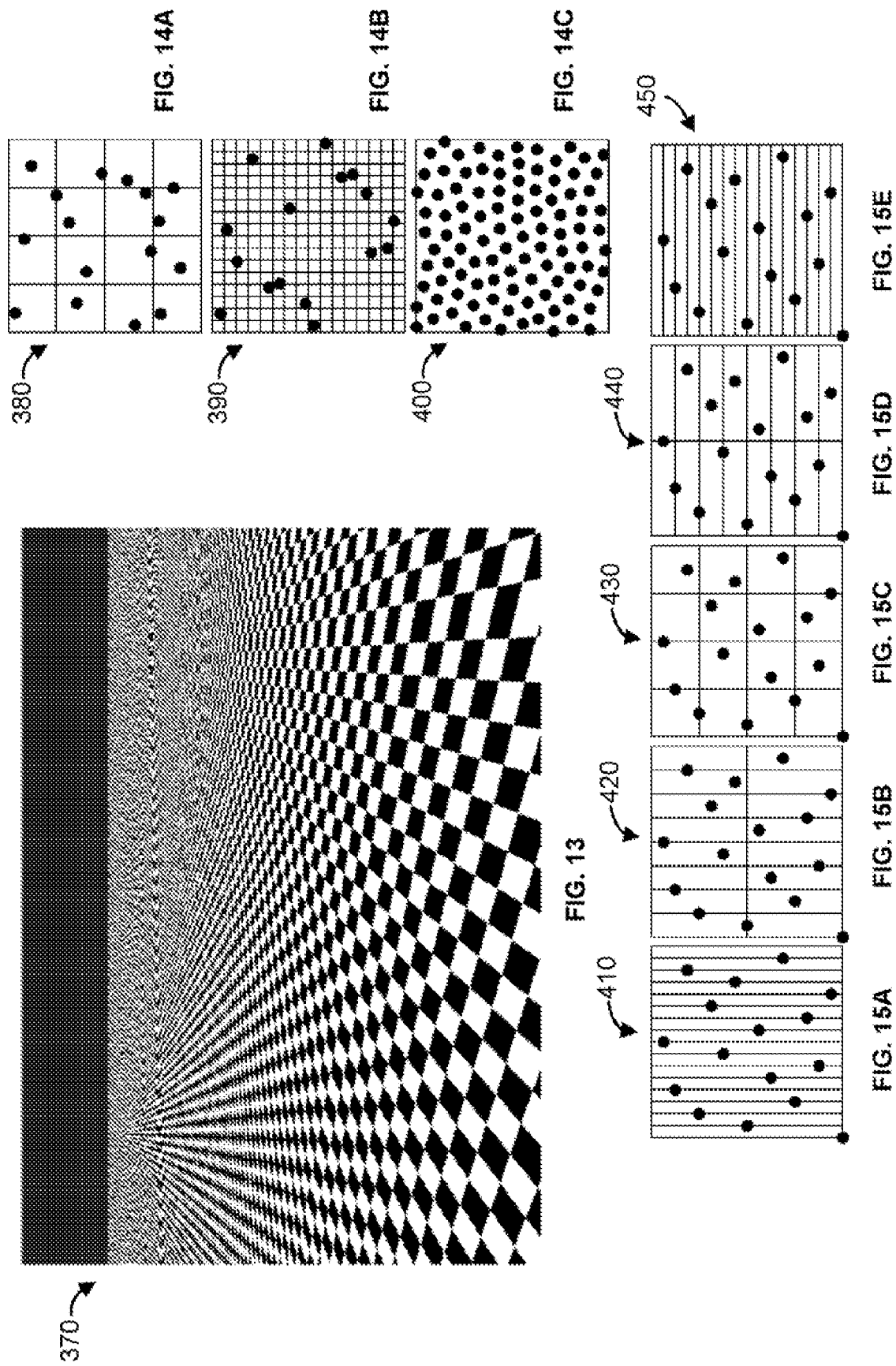

IMAGE SYNTHESIS METHODS AND SYSTEMS FOR GENERATING SAMPLE POINTS IN A GRAPHICS SCENE

CROSS-REFERENCE TO RELATED APPLICATIONS AND INCORPORATION BY REFERENCE

This application for patent claims the priority benefit of commonly owned Provisional Application for U.S. Patent Ser. No. 60/709,173 filed Aug. 18, 2005, entitled "Image Synthesis Methods and Systems," and is a continuation-in-part of commonly owned U.S. patent application Ser. No. 10/299,958, filed Nov. 19, 2002 (which issued as U.S. Pat. No. 7,167,175 on Jan. 23, 2007), entitled "System and Computer-Implemented Method for Evaluating Integrals Using a Quasi-Monte Carlo Methodology in Which Sample Points Represent Dependent Samples Generated Using a Low-Discrepancy Sequence," both of which are incorporated herein by reference.

Also incorporated herein by reference is commonly owned U.S. patent application Ser. No. 08/880,418, filed Jun. 23, 1997, in the names of Rolf Herken and Martin Grabenstein, now U.S. Pat. No. 6,529,193, entitled "System and Method for Generating Pixel Values for Pixels in an Image Using Strictly Deterministic Methodologies for generating Sample Points," hereinafter referred to as "Grabenstein."

FIELD OF THE INVENTION

The present invention relates generally to methods and systems for image synthesis in and by digital computing systems, such as for motion pictures and other computer graphics applications, and in particular, relates to methods, systems, devices, and computer software for efficient synthesis of realistic images. The invention also relates to the field of systems and computer-implemented methods for evaluating integrals, and provides systems and computer-implemented methods for evaluating integrals using quasi-Monte Carlo methodologies, and in particular embodiments, adaptive quasi-Monte Carlo integration and adaptive integro-approximation in conjunction with techniques including a scrambled Halton Sequence, stratification by radical inversion, stratified samples from the Halton Sequence, deterministic scrambling, bias elimination by randomization, adaptive and deterministic anti-aliasing anti-aliasing by rank-1 lattices, and trajectory splitting by dependent sampling and domain stratification induced by rank-1 lattices.

BACKGROUND OF THE INVENTION

The use of synthetic images has become increasingly important and widespread in motion pictures and other commercial and scientific applications. A synthetic image represents a two-dimensional array of digital values, called picture elements or pixels, and thus can be regarded as a two-dimensional function. Image synthesis, then, is the process of creating synthetic images from scenes.

As a general matter, digital images are generated by rasterization (as described in greater detail below and in the references cited in this document, which are incorporated herein by reference as if set forth in their entireties herein), or, in the case of photorealistic images of three-dimensional scenes, by ray tracing (also as described in greater detail below and in the references cited herein). Both approaches aim at determining the appropriate color for each pixel by projecting the original function into the pixel basis. Due to the discrete representation of the original function, the problem of aliasing arises, as described below.

Image synthesis is perhaps the most visible part of computer graphics. On the one hand it is concerned with physically correct image synthesis, which intends to identify light paths that connect light sources and cameras and to sum up their contributions. On the other hand it also comprises non-photorealistic rendering, such as the simulation of pen strokes or watercolor.

The underlying mathematical task of image synthesis is to determine the intensity $I(k, l, t, \lambda)$, where $(k, l)$ is the location of a pixel on the display medium. Computing the intensity of a single pixel requires an integration function over the pixel area. This integral is often highly complex, as discussed below, and cannot be solved analytically, thus requiring numerical methods for solution, which may include Monte Carlo and quasi-Monte Carlo methods. In particular, image synthesis is an integro-approximation problem for which analytical solutions are available only in exceptional cases. Therefore numerical techniques need to be applied. While standard graphics text books still recommend elements of classical Monte Carlo integration, the majority of visual effects in movie industry are produced by using quasi-Monte Carlo techniques.

However, typical numerical methods used in such applications have their own limitations and attendant problems. It would therefore be desirable to provide improved methods and systems for image synthesis whereby realistic images can be rendered efficiently.

In computer graphics, a computer is used to generate digital data that represents the rejection of surfaces of objects in, for example, a three-dimensional scene illuminated by one or more light sources, onto a two-dimensional image plane, to simulate the recording of the scene by, for example, a camera. The camera may include a lens for projecting the image of the scene onto the image plane, or it may comprise a pinhole camera in which case no lens is used. The two-dimensional image is in the form of an array of picture elements, called "pixels" or "pels," and the digital data generated for each pixel represents the color and luminance of the scene as projected onto the image plane at the point of the respective pixel in the image plane. The surfaces of the objects may have any of a number of characteristics, including shape, color, specularity, texture, and so forth, which are preferably rendered in the image as closely as possible, to provide a realistic-looking image.

Generally, the contributions of the light reflected from the various points in the scene to the pixel value representing the color and intensity of a particular pixel are expressed in the form of the one or more integrals of relatively complicated functions. Since the integrals used in computer graphics generally will not have a closed-form solution, numerical methods must be used to evaluate them and thereby generate the pixel value typically a conventional "Monte Carlo" method has been used in computer graphics to numerically evaluate the integrals. Generally, in the Monte Carlo method, to evaluate an integral $$\langle f \rangle = \int_{[0,1)^s} f(x) dx \tag{1.1}$$

where $f(x)$ is a real function on the s-dimensional unit cube $[0,1)^s$, that is, an s-dimensional cube each of whose dimension includes "zero." and excludes "one." First, a number of N of statistically-independent randomly-positioned points $x_i$, $i=1, \ldots, N$, are generated over the integration domain. The random points $x_i$ are used as sample points for which sample values $f(x_i)$ are generated for the function $f(x)$, and an estimate $\bar{f}$ for the integral is generated as $$\langle f \rangle \approx \bar{f} = \frac{1}{N} \sum_{i=1}^{N} f(x_i) \tag{1.2}$$

As the number of random points used in generating the sample points $f(x_i)$ increases, the value of the estimate $\bar{f}$ will converge toward the actual value of the integral $\langle f \rangle$. Generally, the distribution of estimate values that will be generated for various values of N, that is, for various numbers of sample points, of being normal distributed around the actual value with a standard deviation σ which can be estimated by $$\sigma = \sqrt{\frac{1}{N-1} (\bar{f^2} - \bar{f}^2)} \tag{1.3}$$

if the points $x_i$ used to generate the sample values $f(x_i)$ are statistically independent, that is, if the points $x_i$ are truly positioned at random in the integration domain.

Generally, it has been believed that random methodologies like the Monte Carlo method are necessary to ensure that undesirable artifacts, such as Moiré patterns and aliasing and the like which are not in the scene, will not be generated in the generated image. However, several problems arise from use of the Monte Carlo method in computer graphics. First, since the sample points $x_i$ used in the Monte Carlo method are randomly distributed, they may clump in various regions over the domain over which the integral is to be evaluated. Accordingly, depending on the set of points that are generated, in the Monte Carlo method for significant portions of the domain there may be no sample points $x_i$ for which sample values $f(x_i)$ are generated. In that case, the error can become quite large. In the context of generating a pixel value in computer graphics, the pixel value that is actually generated using the Monte Carlo method may not reflect some elements which might otherwise be reflected if the sample points $x_i$ were guaranteed to be more evenly distributed over the domain. This problem can the alleviated somewhat by dividing the domain into a plurality of sub-domains, but is generally difficult to determine a priori the number of sub-domains into which the domain should be divided, and, in addition, in a multi-dimensional integration region, which would actually be used in computer graphics rendering operations, the partitioning of the integration domain into sub-domains, which are preferably of equal size, can be quite complicated.

In addition, since the method makes use of random numbers, the error $|\bar{f} - \langle f \rangle|$, where $|x|$ represents the absolute value of the value x between the estimate value $\bar{f}$ and actual value $\langle f \rangle$ is probabilistic, and, since the error values for various large values of N are close to normal distribution around the actual value $\langle f \rangle$, only sixty-eight percent of the estimate values $\bar{f}$ that might be generated are guaranteed to lie within one standard deviation of the actual value $\langle f \rangle$.

Furthermore, as is clear from Equation (1.3), the standard deviation σ decreases with increasing numbers N of sample points, proportional to the reciprocal of square root of N, that is $$\frac{1}{\sqrt{N}}.$$

Thus, if it is desired to reduce the statistical error by a factor of two, it will be necessary to increase the number of sample points N by a factor of four, which, in turn, increases the computational load that is required to generate the pixel values, for each of the numerous pixels in the image.

Additionally, since the Monte Carlo method requires random numbers to define the coordinates of respective sample points $x_i$ the integration domain, an efficient mechanism for generating random numbers is needed. Generally, digital computers are provided with so-called "random number generators," which are computer programs which can be processed to generate a set of numbers that are approximately random. Since the random number generators use deterministic techniques, the numbers that are generated are not truly random. However, the property that subsequent random numbers from a random number generator are statistically independent should be maintained by deterministic implementations of pseudo-random numbers on a computer.

Grabenstein describes a computer graphics system and method for generating pixel values for pixels in an image using a strictly deterministic methodology for generating sample points, which avoids the above-described problems with the Monte Carlo method. The strictly deterministic methodology described in Grabenstein provides a low-discrepancy sample point sequence which ensures, a priori, that the sample points are generally more evenly distributed throughout the region over which the respective integrals are being evaluated. In one embodiment, the sample points that are used are based on the Halton sequence.

In a Halton sequence generated for number base b, where base b is a selected prime number, the k-th value of the sequence, represented by $H_b^k$ is generated by use of a "radical inverse" function $\Phi_b$, that is generally defined as $$\Phi_b: N_0 \to I \tag{1.4}$$

$$i = \sum_{j=0}^{\infty} a_j(i) b^j \mapsto \sum_{j=0}^{\infty} a_j(i) b^{-j-1}$$

where $(a_j)_{j=0}^{\infty}$ is the representation of i in integer base b. Generally, a radical inverse of a value k is generated by technique including the following steps (1)-(3):

(1) writing the value k as a numerical representation of the value in the selected base b, thereby to provide a representation for the value as $D_M D_{M-1} \ldots D_2 D_1$, where $D_m$ (m=1, 2, \ldots, M) are the digits of the representation;

(2) putting a radix point, corresponding to a decimal point for numbers written in base ten, at the least significant end of the representation $D_M D_{M-1} \ldots D_2 D_1$ written in step (1) above; and (3) reflecting the digits around the radix point to provide 0. $D_M D_{M-1} \ldots D_2 D_1$, which corresponds to $H_b^k$.

It will be appreciated that, regardless of the base b selected for the representation for any series of values one two, . . . k, written in base b, the least significant digits of the representation will change at a faster rate than the most significant digits. As a result in the Halton sequence $H_b^1, H_b^2, \ldots H_b^k$, the most significant digits will change at the faster rate so that the early values in the sequence will be generally widely distributed over the interval from zero to one, and later values in the sequence will fill in interstices among the earlier values in the sequence. Unlike the random or pseudo-random numbers used in the Monte Carlo method as described above, the values of the Halton sequence are not statistically independent; on the contrary, the values of the Halton sequence are strictly deterministic, "maximally avoiding" each other over the interval, and so they will not clump, whereas the random or pseudo-random numbers used in the Monte Carlo method may clump.

It will be appreciated that the Halton sequence as described above provides a sequence of values over the interval from zero to one, inclusive along a single dimension. A multi-dimensional Halton sequence can be generated in a similar manner, but using a different base for each dimension, where the bases are relatively prime.

A generalized Halton sequence, of which the Halton sequence described above is a special case, is generated as follows. For each starting point along the numerical interval from zero to one, inclusive, a different Halton sequence is generated. Defining the pseudo-sum $x \oplus_p y$ for any x and y over the interval from zero to one, inclusive, for any integer p having a value greater than the pseudo-sum is formed by adding the digits representing x and y in reverse order, from the most significant digit to the least significant digit, and for each addition also adding in the carry generated from the sum of next more significant digits. Thus, if x in base b is represented by $0.X_1X_2 \ldots X_{M-1}X_M$, where each $X_m$ is a digit in base b, and if y in base b is represented by $0.Y_1Y_2 \ldots Y_{N-1}Y_N$, where each $Y_n$ is a digit in base b, where M is the number of digits in the representation of x in base b, and where N is the number of digits in the representation of y in base b, and where M and N may differ, then the pseudo-sum z is represented by $0.Z_1Z_2 \ldots Z_{L-1}Z_L$, where each $Z_1$ is a digit in base b given by $Z_1 = (X_1 + Y_1 + C_1) \mod b$, where mod represents the modulo function, and $$C_1 = \begin{cases} 1 & \text{for } X_{t-1} + Y_{t-1} + Z_{t-1} \geq b \\ 0 & \text{otherwise} \end{cases}$$

is a carry value from the 1-1-st digit position, with $C_1$ being set to zero.

Using the pseudo-sum function as described above, the generalized Halton sequence that is used in the system described in Grabenstein is generated as follows. If b is an integer, and $x_0$ is an arbitrary value on the interval from zero to one, inclusive then the p-adic von Neumann-Kakutani transformation $T_b(x)$ is given by $$T_p(x) := x \oplus_p \frac{1}{b} \quad (1.5)$$

and the generalized Halton sequence $x_0, x_1, x_2, \ldots$ is defined recursively as $$x_{n+1} = T_b(x_n) \quad (1.6)$$

From Equations (1.5) and (1.6), it is clear that, for any value for b, the generalized Halton sequence can provide that a different sequence will be generated for each starting value of x, that is for each $x_0$. It will be appreciated that the Halton sequence $H_b^k$ as described above is a special case of the generalized Halton sequence in Equations (1.5) and (1.6) for $x_0 = 0$.

The use of a strictly deterministic low-discrepancy sequence such as the Halton sequence or the generalized Halton sequence can provide a number of advantages over the random or pseudo-random numbers that have are used in connection with the Monte Carlo technique. Unlike the random numbers used in connection with the Monte Carlo technique, the low discrepancy sequences ensure that the sample points are more evenly distributed over a respective region or time interval, thereby reducing error in the image which can result from clumping of such sample points which can occur in the Monte Carlo technique. That can facilitate the generation of images of improved quality when using the same number of sample points at the same computational cost as in the Monte Carlo technique.

It would also be desirable to provide methods and systems that provide image synthesis by adaptive quasi-Monte Carlo integration and adaptive integro-approximation in conjunction with techniques including a scrambled Halton Sequence, stratification by radical inversion, stratified samples from the Halton Sequence, deterministic scrambling, bias elimination by randomization, adaptive and deterministic anti-aliasing, anti-aliasing rank-1 lattices, and trajectory splitting by dependent sampling and domain stratification induced by rank-1 lattices.

SUMMARY OF THE INVENTION

One aspect of the present invention relates to the generation and synthesis of images, such as for display in a motion picture or other dynamic display. The invention provides improved methods and systems for image synthesis, including efficient methods for determining intensity whereby realistic images can be rendered efficiently within the limits of available computational platforms.

More particularly, the invention provides a new and improved system and computer-implemented method for evaluating integrals using quasi-Monte Carlo methodologies, and in particular embodiments, adaptive quasi-Monte Carlo integration and adaptive integro-approximation in conjunction with techniques including a scrambled Halton Sequence, stratification by radical inversion, stratified samples from the Halton Sequence, deterministic scrambling, bias elimination by randomization, adaptive and deterministic anti-aliasing, anti-aliasing by rank-1 lattices, and trajectory splitting by dependent sampling and domain stratification induced by rank-1 lattices.

In brief summary, the invention provides a computer graphics system for generating a pixel value for a pixel in an image, the pixel value being representative of a point in a scene as recorded on an image plane of a simulated camera, the computer graphics system comprising a sample point generator and a function evaluator. The sample point generator is configured to generate a set of sample points, at least one sample point being generated using at least one dependent sample, the at least one dependent sample comprising at least one element of a low-discrepancy sequence offset by at least one element of another low-discrepancy sequence. The function evaluator is configured to generate at least one a value representing an evaluation of a selected function at one of the sample points generated by the sample point generator, the value generated by the function evaluator corresponding to the pixel value.

Another aspect of the invention comprises a computer program product for use in a computer graphics system, for enabling the computer graphics system to generate a pixel value for a pixel in an image displayable via a display device, the pixel value being representative of a point in a scene, the computer program product comprising a computer-readable medium having encoded thereon:

A. computer-readable program instructions executable to enable the computer graphics system to generate a set of sample points, at least one sample point being generated using at least one sample, the at least one sample comprising at least one element of a low-discrepancy sequence, and wherein the set of sample points comprises quasi-Monte Carlo points of low discrepancy; and B. computer-readable program instructions executable to enable the computer graphics system to evaluate a selected function at one of the sample points to generate a value, the generated value corresponding to the pixel value, the pixel value being usable to generate a display-controlling electronic output.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 5 and 6 show code fragments for generating imaging data in accordance with aspects of the invention.

FIGS. 7A and 7B show plots of the first two components of the Halton sequence.

FIGS. 8A and 8B show a pair of low dimensional projections, including the Halton sequence and the scrambled Halton sequence for designated points.

FIG. 13 shows a computer-generated image of an infinite plane with a checkerboard texture.

FIGS. 14A-C are a series of alternative sampling patterns of computer graphics.

FIGS. 15A-E show sampling patterns using quasi-Monte Carlo points.

DETAILED DESCRIPTION OF THE INVENTION

The present invention relates to the generation and of synthesis of images, such as for display in a motion picture or other dynamic display. The techniques described herein are practiced as part of a computer graphics system, in which a pixel value is generated for each pixel in an image. The pixel value is representative of a point in a scene as recorded on an image plane of a simulated camera. The computer graphics system is configured to generate the pixel value for an image using a selected methodology.

The following discussion describes methods, structures, systems, and display technology in accordance with these techniques. It will be understood by those skilled in the art that the described methods and systems can be implemented in software, hardware, or a combination of software and hardware using conventional computer apparatus such as a personal computer (PC) or equivalent device operating in accordance with (or emulating) a conventional operating system such as Microsoft Windows, Linux, or Uix, either in a standalone configuration or across a network. The various processing means and computational means described below and recited in the claims may therefore be implemented in the software and/or hardware elements of a property configured digital processing device or network of devices. Processing may be performed sequentially or in parallel, and may be implemented using special purpose or reconfigurable hardware.

Figure 1:
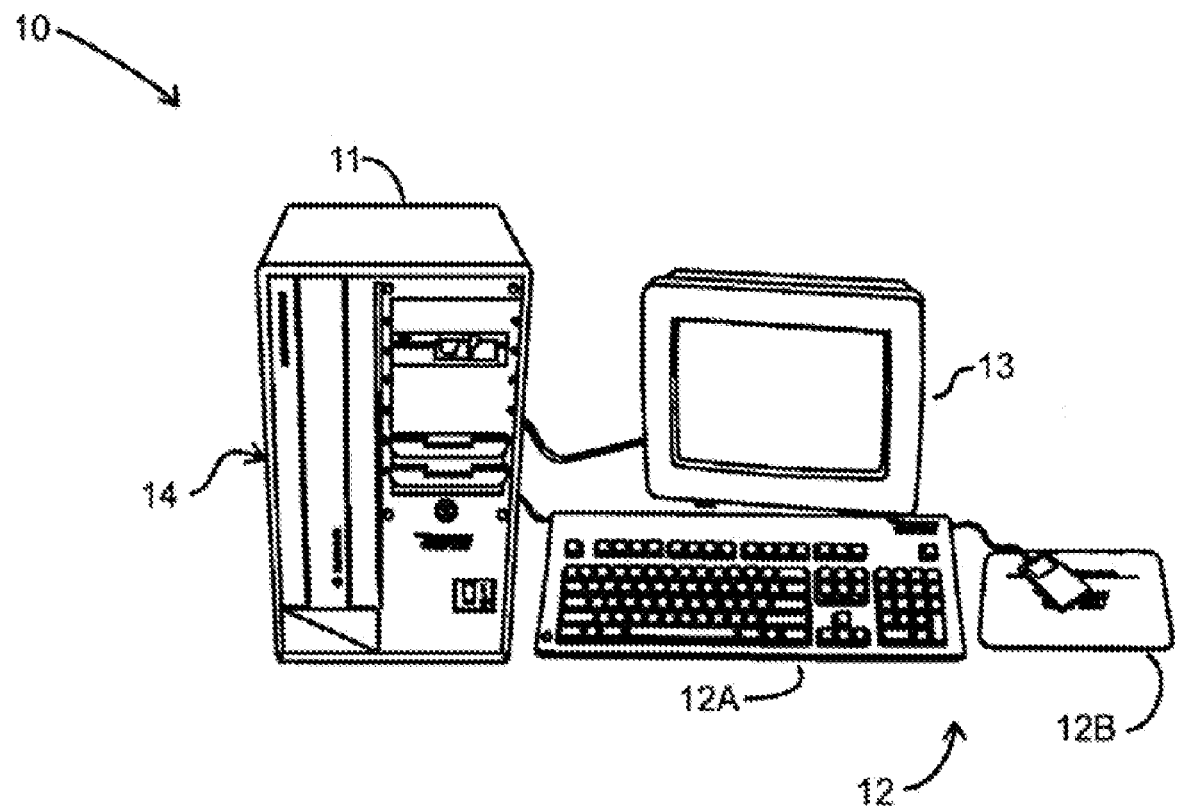
FIG. 1 shows a diagram of a computer graphics system suitable for use in implementations of various aspects of the invention described herein.

FIG. 1 attached hereto depicts an illustrative computer system 10 that makes use of such a strictly deterministic methodology. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, one or more processor, memory and mass storage devices, such as disk and/or tape storage elements (not separately shown), which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator main input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the key board 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

Figure 2:
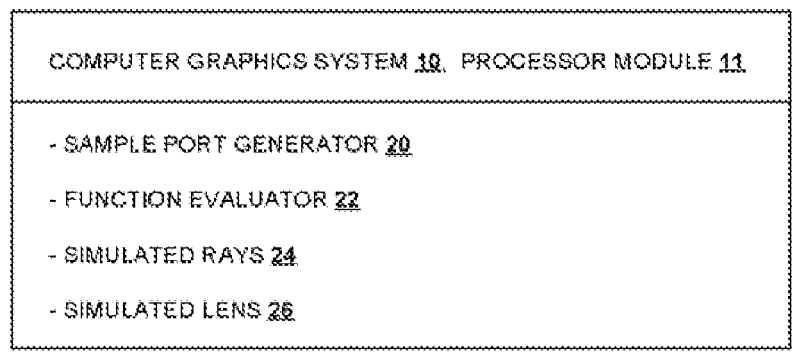
FIG. 2 shows a diagram illustrating components of the computer graphics system and processor module shown in FIG. 1.

FIG. 2 shows a diagram illustrating the sample point generator 20, function evaluator 22, simulated rays 24 and simulated lens 26 processing aspects of a computer graphics system 11 and processor module 11 in accordance with the invention.

Figure 2A:
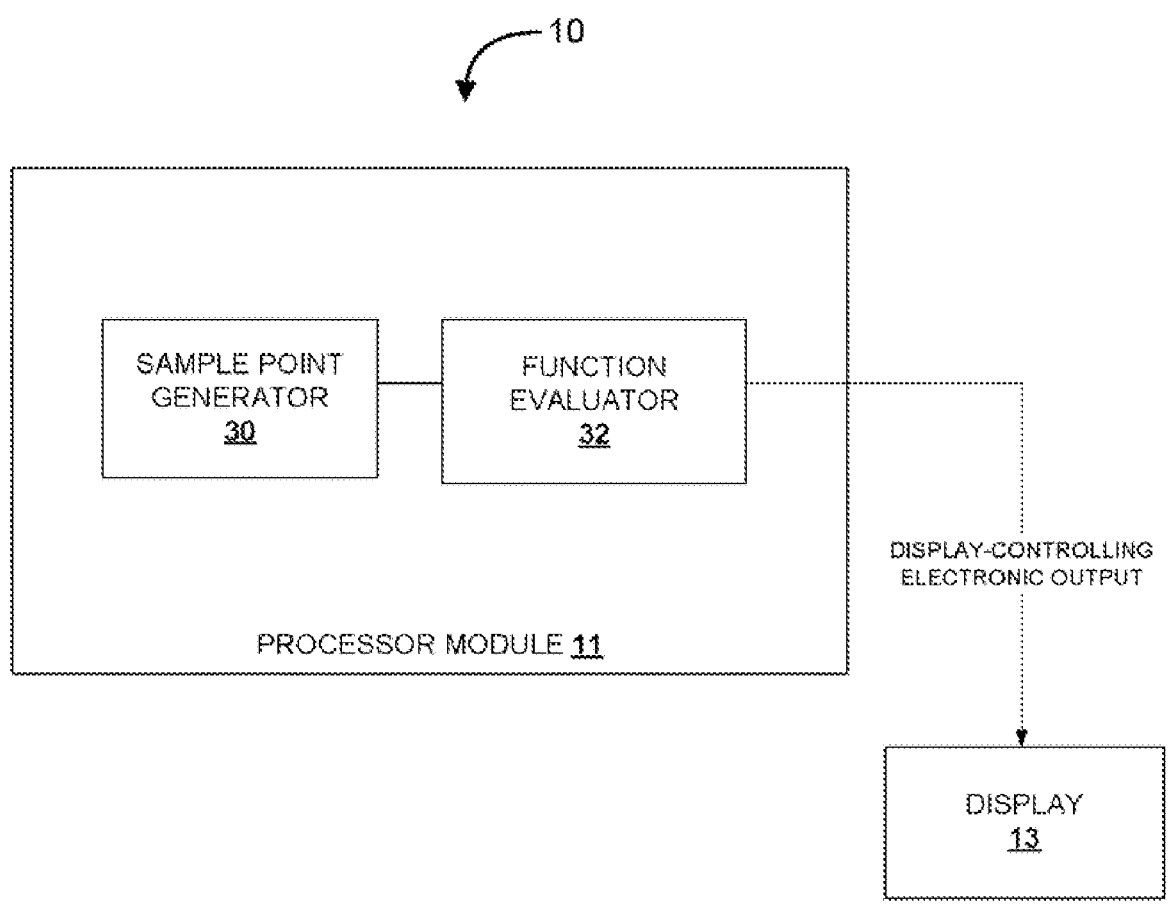
FIG. 2A shows a diagram illustrating further components of a computing system according to aspects of the present invention.

FIG. 2A shows a diagram illustrating additional components of the computing system 10 according to further aspects of the invention, described below. As shown in FIG. 2A, the computing system 10 further includes a sample point generator 30 for generating a set of sample points, at least one sample point being generated using at least one sample, the at least one sample comprising at least one element of a sequence, and wherein the set of sample points comprises quasi-Monte Carlo points. The computing system 10 also includes a function evaluator 32 in communication with the sample point generator 30 for evaluating a selected function at one of the sample points to generate a value, the generated value corresponding to the pixel value. The pixel value is usable to generate an electronic output that controls the display 13.

Figure 3:
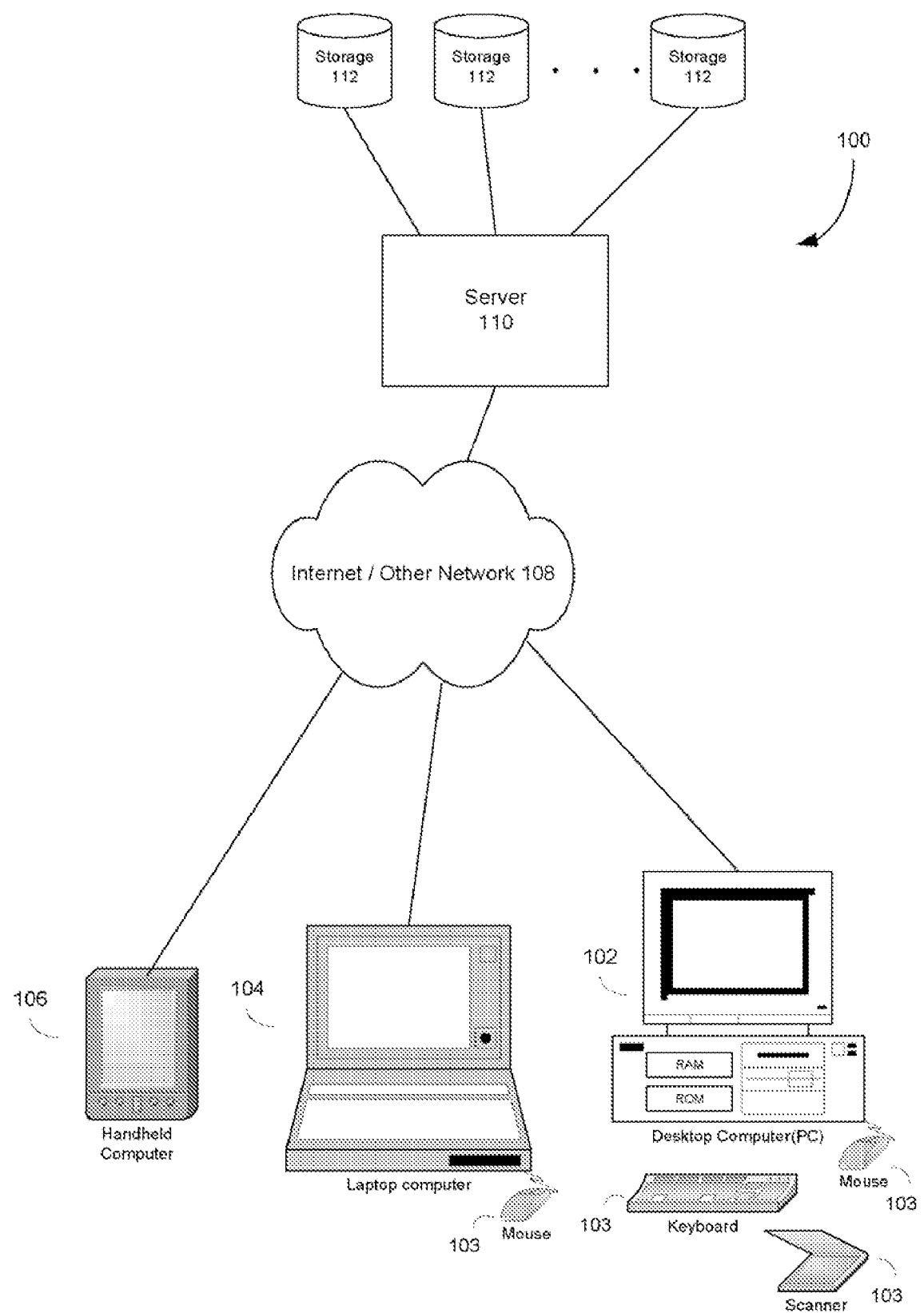
FIG. 3 shows a diagram of a network configuration suitable for use in implementations of various aspects of the invention described herein.

In addition to the computer system 10 shown in FIGS. 1 and 2, methods, devices or software products in accordance with the invention can operate on any of a wide range of conventional computing devices and systems, such as those depicted by way of example in FIG. 3 (e.g., network system 100), whether standalone, networked, portable or fixed, including conventional PCs 102, laptops 104, handheld or mobile computers 106, or across the Internet of other networks 108, which may in turn include servers 110 and storage 112.

Figure 4:
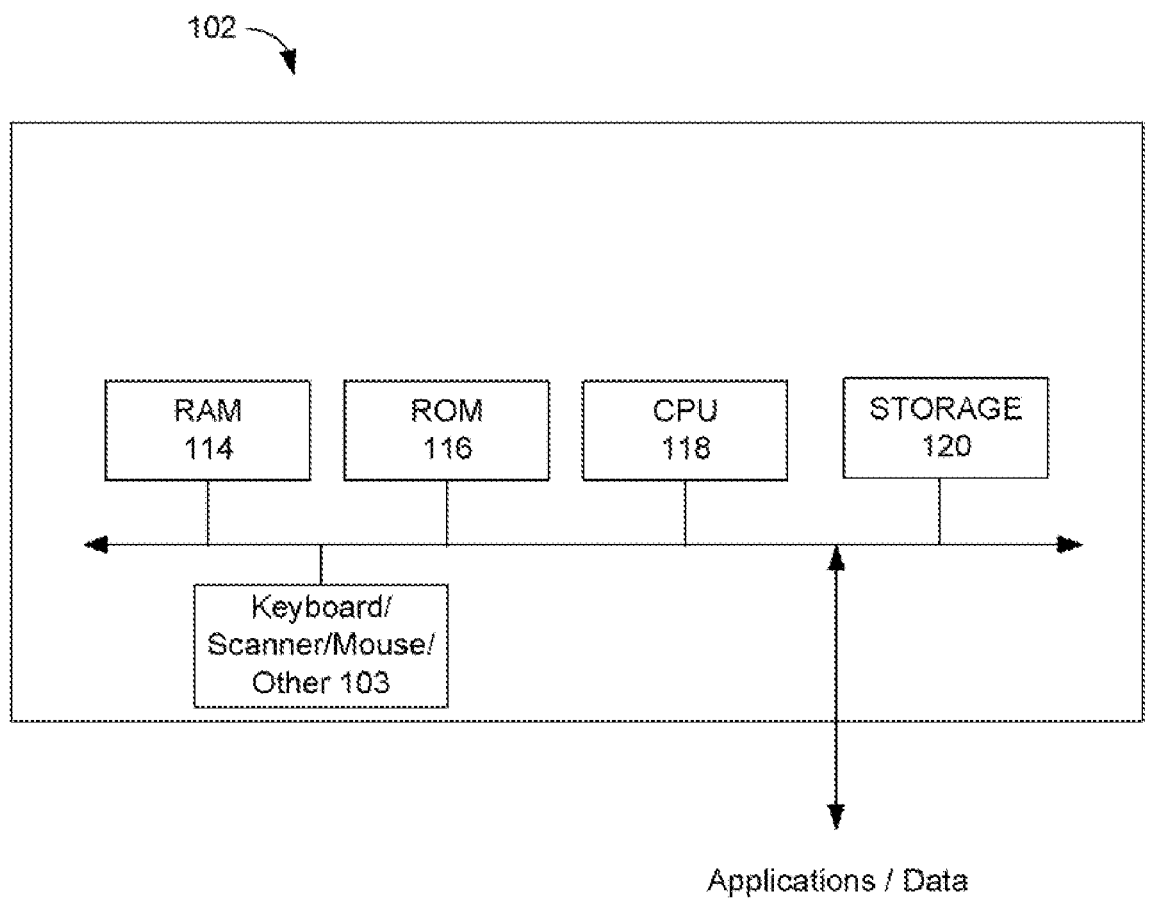
FIG. 4 shows a diagram illustrating components of the of the network configuration shown in FIG. 3.

In line with conventional computer software and hardware practice, a software application configured in accordance with the invention can operate within, e.g., a PC 102 like that shown in FIG. 4, in which program instructions can be read from CD ROM 116, magnetic disk or other storage 120 and loaded into RAM 114 for execution by CPU 118. Data can be input into the system via any known device or means, including a conventional keyboard, scanner, mouse or other elements 103.

Those skilled in the art will understand that the method aspects of the invention described below can be executed in hardware elements, such as an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, Calif. The actual semiconductor elements of such ASICs and equivalent integrated circuits are not part of the present invention, and will not be discussed in detail herein.

Those skilled in the art will also understand that method aspects of the present invention can be carried out with commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element, or any other known means of encoding, storing or providing digital information, whether local to or remote from the workstation. PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts, are not necessarily part of the present invention, and their selection can be left to the implementer.

In particular, the systems illustrated in FIGS. 1-4 may be used, in accordance with the following described aspects of the invention, to implement a computer graphics system that evaluates integrals using a quasi-Monte Carlo methodology, which can include adaptive quasi-Monte Carlo integration and adaptive integro-approximation in conjunction with techniques including a scrambled Halton Sequence, stratification by radical inversion, stratified samples from the Halton Sequence, deterministic scrambling, bias elimination by randomization, adaptive and deterministic anti-aliasing, anti-aliasing by rank-1 lattices, and trajectory splitting by dependent sampling and domain stratification induced by rank-1 lattices.

Various aspects examples features embodiments and practices in accordance with the present invention will be set forth in detail in the present Detailed Description of the Invention, which is organized into the following sections:

I. Introduction, Overview and Description of Quasi-Monte Carlo Methodologies in Which Sample Points Represent Dependent Samples Generated Using a Low-Discrepancy Sequence II. Image Synthesis by Adaptive Quasi-Monte Carlo Integration III. Additional Examples and Points Regarding Quasi-Monte Carlo Integration IV. General Methods The present application is a continuation-in-part of pending, commonly owned U.S. patent application Ser. No. 10/299,958 filed Nov. 19, 2002 entitled "System and Computer-Implemented Method for Evaluating Integrals Using a Quasi-Monte Carlo Methodology Which Sample Points Represent Dependent Samples Generated Using a Low-Discrepancy Sequence," and the detailed description of the present invention begins by setting forth salient points from that application.

I. Introduction, Overview and Description of Quasi-Monte Carlo Methodologies in Which Sample Points Represent Dependent Samples Generated Using a Low-Discrepancy Sequence Aspects of the present invention provide a computer graphic system and method for generating pixel values for pixel in an image of a scene, which makes use of a strictly deterministic quasi-Monte Carlo methodology in conjunction with various sub-techniques which can include, for example, trajectory splitting by dependent sampling for generating sample points for use in generating sample values for evaluating the integral or integrals whose function(s) represent the contributions of the light reflected from the various points in the scene to the respective pixel value, rather than the random or pseudo-random Monte Carlo methodology which has been used in the past. The strictly deterministic methodology ensures a priori that the sample points be generally more evenly distributed over the interval or region over which the integral(s) is (are) to be evaluated in a low-discrepancy manner.

It will be helpful to initially provide some background on operations performed by the computer graphics system in generating an image. Generally, the computer graphic system generates an image that attempts to simulate an image of a scene that would be generated by a camera. The camera includes a shutter that will be open for a predetermined time T starting at a time $t_0$ to allow light from the scene to be directed to an image plane. The camera may also include a tens or lens model generally, "lens") that serves to focus light from the scene onto the image plane. The average radiance flux $L_{m,n}$ through a pixel at position (m, n) on an image plane P, which represents the plane of the camera's recording medium, is determined by $$L_{m,n} = \frac{1}{|A_P| \cdot T \cdot |A_L|} \int_{A_P} \int_{t_0}^{t_0+T} \int_{A_L} L(h(x, t, y), -\omega(x, t, y)) f_{m,n}(x, y, t) dy\, dt\, dx \quad (1.7)$$

where $A_p$ refers to the area of the pixel, $A_L$ refers to the area of the portion of the lens through which rays of light pass front the scene to the pixel, and $f_{m,n}$ represents a filtering kernel associated with the pixel. An examination of the integral in Equation (1.7) will reveal that, for the variables of integration, x, y and t, the variable y refers to integration over the lens area $A_L$, the variable t refers to integration over time (the time interval from $t_0$ to $t_0+T$), and the variable x refers to integration over the pixel area $A_p$.

The value of the integral in Equation (1.7) is approximated in accordance with a quasi-Monte Carlo methodology by identifying $N_p$ sample points $x_i$ in the pixel area, and, for each sample point, shooting $N_T$ rays at times $t_{i,j}$ in the time interval to $t_0$ to $t_0+T$ through the focus into the scene, each ray spanning $N_L$ sample points $y_{i,j,k}$ on the lens area $A_L$. The manner in which subpixel jitter positions $x_i$, points in time $t_{i,j}$ and positions on the lens $y_{i,j,k}$ are determined will be described below. These three parameters determine the primary ray hitting the scene geometry in $h(x_i, t_{i,j}, y_{i,j,k})$ with the ray direction $\omega(xi, ti,j, yi,j,k)$. In this manner, the value of the integral in Equation (1.7) can be approximated as follows:

$$L_{m,n} \approx \frac{1}{N} \sum_{i=0}^{N_P-1} \frac{1}{N_T} \sum_{j=0}^{N_T-1} \frac{1}{N_L} \sum_{k=0}^{N_L-1} L(h(x_i, t_{i,j}, y_{i,j,k}), -\omega(x_i, t_{i,j} y_{i,j,k})) f_{m,n}(x_i, t_{i,j}, y_{i,j,k}), \quad (1.8)$$

where is the total number of rays directed at the pixel.

It will be appreciated that rays directed from the scene toward the image plane can comprise rays directly from one or more light sources in the scene, as well as rays reflected off surfaces of objects in the scene. In addition, it will be appreciated that a ray that is reflected off a surface may have been directed to the surface directly from a light source, or a ray that was reflected off another surface. For a surface that reflects light rays, a reflection operator $T_{f_r}$ is defined that includes a diffuse portion $T_{f_d}$, a glossy portion $T_{f_g}$ and a specular portion $T_{f_s}$, or $$T_{f_r} = T_{f_d} + T_{f_g} + T_{f_s} \quad (1.9)$$

In that case, the Fredholm integral equation $L = L_e + T_{f_r}L$ governing light transport can be represented as $$L = L_e + T_{f_r - f_s}L_e + T_{f_s}(L - L_e) + T_{f_s}L + T_{f_d}T_{f_g + f_s}L + T_{f_d}T_{f_d}L \quad (1.10)$$

where transparency has been ignored for the sake of simplicity; transparency is treated in an analogous manner. The individual terms in Equation (1.10) are as follows:

(i) $L_e$ represents flux due to a light source;

(ii) $T_{f_r - f_s} L_e$ (where $T_{f_r - f_s} - T_{f_r} = -T_{f_s}$) represents direct illumination, that is, flux reflected off a surface that was provided thereto directly by a light source; the specular component, associated with the specular portion $T_{f_s}$ of the reflection operator, will be treated separately since it is modeled using a δ-distribution;

(iii) $T_{f_g}(L - L_e)$ represents glossy illumination, which is handled by recursive distribution ray tracing, where, in the recursion, the source illumination has already been accounted for by the direct illumination (item (ii) above);

(iv) $T_{f_s}L$ represents a specular component, which is handled by recursively using L for the reflected ray;

(v) $T_{f_d}T_{f_g + f_s}L$ (where $T_{f_g + f_s} = T_{f_g} + T_{f_s}$) represents a caustic component, which is a ray that has been reflected off a glossy or specular surface (reference the $T_{f_g + f_s}$ operator) before hitting a diffuse surface (reference the $T_{f_s}$ operator); this contribution can be approximated by a high resolution caustic photon map; and (vi) $T_{f_s}T_{f_d}L$ represents ambient light which is very smooth and is therefore approximated using a low resolution global photon map.

As noted above, the value of the integral in Equation (1.7) is approximated by solving Equation (1.8) making use of sample points, $x_i$, $t_{i,j}$, and $y_{i,j,k}$, where $x_i$ refers to sample points within area $A_I$ of the respective pixel at location (m, n) in the image plane $t_{i,j}$ refers to sample points within the time interval $t_0$ to $t_0+T$ during which the shutter is open and $y_{i,j,k}$ refers to sample points on the lens $A_L$. In accordance with one aspect of the invention, the sample points $x_i$ comprise two-dimensional Hammersley points, which are defined as $$\left(\frac{i}{N}, \Phi_2(i)\right)$$

where $0 \leq i < N$, and $\Phi_2(i)$ refers to the radical inverse of i in base two. Generally, the s-dimensional Hammersley point set is defined as follows:

$$U_{N,s}^{Hammerstey}: \{0, \ldots, N-1\} \to I^s \quad (1.11)$$

$$i \mapsto x_i := \left(\frac{i}{N}, \Phi_{b_1}(i), \ldots, \Phi_{b_{s-1}}(i)\right)$$

where $I^s$ is the s-dimensional unit cube $[0,1)^s$ (that is, an s-dimensional cube each of whose dimensions includes zero, and excludes one), the number of points N in the set is fixed and $b_1, \ldots, b_{s-1}$ are bases. The bases do not need to be prime numbers, but they are preferably relatively prime to provide a uniform distribution. The radical inverse function $\Phi_b$, in turn, is generally defined as $$\Phi_b: N_0 \to I \quad (1.12)$$

$$i = \sum_{j=0}^{\infty} a_j(i) b^j \mapsto \sum_{j=0}^{\infty} a_j(i) b^{-j-1}$$

where $(a_j)_{j=0}^{\infty}$ is the representation of i in integer base b. At $N=(2^n)^2$, the two-dimensional Hammersley points are a (0, 2n, 2)-net in base two, which are stratified on a $2^n \times 2^n$ grid and a Latin hypercube sample at the same time. Considering the grid as subpixels, the complete subpixel grid underlying the image plane can be filled by simply abutting copies of the grid to each other.

Given integer subpixel coordinates $(s_x, s_y)$ the instance i and coordinates (x, y) for the sample point $x_i$ in the image plane can be determined as follows. Preliminarily, examining $$\left(\frac{i}{N}, \Phi_2(i)\right)_{i=0}^{N-1}$$

one observes the following:
(a) each line in the stratified pattern is a shifted copy of another, and
(b) the pattern is symmetric to the line y=x, that is, each column is a shifted copy of another column.

Accordingly, given the integer permutation $\sigma(k) := 2^n \Phi_2(k)$ for $0 \leq k < 2^n$, subpixel coordinates $(s_x, s_y)$ are mapped onto strata coordinates $(j, k) := (s_x \bmod 2^n, s_y \bmod 2^n)$, an instance number i is computed as $$i = j 2^n + \sigma(k) \quad (1.13)$$

and the positions of the jittered subpixel sample points are determined according to $$x_i = (s_x + \Phi_2(k), s_y + \Phi_2(j)) \quad (1.14)$$

$$= \left(s_x + \frac{\sigma(k)}{2^n}, s_y + \frac{\sigma(j)}{2^n}\right)$$

An efficient algorithm for generating the positions of the jittered subpixel sample points $x_i$ will be provided below in connection with Code Segment 1. A pattern of sample points whose positions are determined as described above in connection with Equations (1.13) and (1.14) has an advantage of having much reduced discrepancy over a pattern determined using a Halton sequence or windowed Halton sequence, as described in Grabenstein, and therefore the approximation described above in connection with Equation (1.8) gives in general a better estimation to the value of the integral described above in connection with Equation (1.7). In addition, if N is sufficiently large, sample points in adjacent pixels will have different patterns, reducing the likelihood that undesirable artifacts will be generated in the image.

A "ray tree" is a collection of paths of light rays that are traced from a point on the simulated camera's image plane into the scene. The computer graphics system 10 generates a ray tree by recursively following transmission, subsequent reflection and shadow rays using trajectory splitting in accordance with another aspect of the invention, a path is determined by the components of one vector of a global generalized scrambled Hammersley point set. Generally, a scrambled Hammersley point set reduces or eliminates a problem that can arise in connection with higher-dimensioned low-discrepancy sequences since the radical inverse function $\Phi_b$ typically has subsequences of b−1 equidistant values spaced by 1/b. Although these correlation patterns are merely noticeable in the full s-dimensional space, they are undesirable since they are prone to aliasing. The computer graphics system 10 attenuates this effect by scrambling, which corresponds to application of a permutation to the digits of the b-ary representation used in the radical inversion. For the symmetric permutation $\sigma$ from the symmetric group $S_b$ over integers $0, \ldots, b-1$, the scrambled radical inverse is defined as $$\Phi_b: N_0 \times S_b \to I \quad (1.15)$$

$$(i, \sigma) \mapsto \sum_{j=0}^{\infty} \sigma(a_j(i)) b^{-j-1} \Longleftrightarrow i = \sum_{j=0}^{\infty} a_j(i) b^j$$

If the symmetric permutation $\sigma$ is the identify, the scrambled radical inverse corresponds to the unscrambled radical inverse. In one embodiment, the computer graphics system 10 generates the symmetric permutation a recursively as follows. Starting from the permutation $\sigma_2 = (0, 1)$ for base b=2, the sequence of permutations is defined as follows:

(i) if the base b is even, the permutation $\sigma_b$ is generated by first taking the values of $2\sigma_{b/2}$ and appending the values of $$2\sigma_{\frac{b}{2}} + 1$$

and (ii) if the base b is odd, the permutation $\sigma_b$ is generated by taking the values of $\sigma_{b-1}$, incrementing each value that is greater than or equal to $$\frac{b-1}{2}$$

by one, and inserting the value $$\frac{b-1}{2}$$

in the middle.

This recursive procedure results in $\sigma_2=(0,1)$
$\sigma_3=(0,1,2)$
$\sigma_4=(0,2,1,3)$
$\sigma_5=(0,3,2,1,4)$
$\sigma_6=(0,2,4,1,3,5)$
$\sigma_7=(0,2,5,3,1,4,6)$
$\sigma_8=(0,4,2,6,1,5,3,7)$ . . .

The computer graphics system 10 can generate a generalized low-discrepancy point set as follows. It is often possible to obtain a low-discrepancy sequence by taking any rational dimensional point x as a starting point and determine a successor by applying the corresponding incremental radical inverse function to the components of x. The result is referred to as the generalized low-discrepancy point set. This can be applied to both the Halton sequence and the Hammersley sequence. In the case of the generalized Halton sequence, this can be formalized as $$x_i(\Phi_{b_1}(i+i_1), \Phi_{b_2}(i+i_2), \ldots, \Phi(i+i_s)) \quad (1.16)$$

where the integer vector $(i_1, i_2, \ldots, i_s)$ represents the offsets per component and is fixed in advance for a generalized sequence. The integer vector can be determined by applying the inverse of the radical inversion to the starting point x. A generalized Hammersley sequence can be generated in an analogous manner.

Returning to trajectory splitting, generally trajectory splitting is the evaluation of a local integral, which is of small dimension and which makes the actual integrand smoother, which improves overall convergence. Applying replication, positions of low-discrepancy sample points are determined that can be used in evaluating the local integral. The low-discrepancy sample points are shifted by the corresponding elements of the global scrambled Hammersley point set. Since trajectory splitting can occur multiple times on the same level in the ray tree, branches of the ray tree are decorrelated in order to avoid artifacts, the decorrelation being accomplished by generalizing the global scrambled Hammersley point set.

An efficient algorithm for generating a ray tree will be provided below in connection with Code Segment 2. Generally, in that algorithm, the instance number i of the low-discrepancy vector, as determined above in connection with Equation (1.13), and the number d of used components, which corresponds to the current integral dimension, are added to the data structure that is maintained for the respective ray in the ray tree. The ray tree of a subpixel sample is completely specified by the instance number i. After the dimension has been set to "two," which determines the component of the global Hammersley point set that is to be used next, the primary ray is cast into the scene to span its ray tree. In determining the deterministic splitting by the components of low discrepancy sample points, the computer graphics system 10 initially allocates the required number of dimensions Δd. For example, in simulating glossy scattering, the required number of dimensions will correspond to "two." Thereafter, the computer graphics system 10 generates scattering directions from the offset given by the scrambled radicals inverses $$\Phi_{b_d}(i, \sigma_{b_d}), \ldots, \Phi_{b_{d+\Delta d-1}}(i, \sigma_{b_{d+\Delta d-1}})$$

yielding the instances $$(y_{i,j})_{j=0}^{M-1} = \left(\Phi_{b_d}(i, \sigma_{b_d}) \oplus \frac{j}{M}, \ldots, \Phi_{b_{d+\Delta d-1}}(i, \sigma_{b_{d+\Delta d-1}}) \oplus \Phi_{b_{d+\Delta d-2}}(j, \sigma_{b_{d+\Delta d-2}})\right) \quad (1.17)$$

where "⊕" refers to "addition modulo one." Each direction of the M replicated rays is determined by $y_{i,j}$ and enters the next level of the ray tree with d':=d+Δd as the new integral dimension in order to use the next elements of the low-discrepancy vector, and i':=i+j in order to use decorrelate subsequent trajectories. Using an infinite sequence of low-discrepancy sample points, the replication heuristic is turned into an adaptive consistent sampling arrangement. That is, computer graphics system 10 can fix the sampling rate ΔM, compare current and previous estimates every ΔM samples, and, if the estimates differ by less than a predetermined threshold value, terminate sampling. The computer graphics system 10 can, in turn, determine the threshold value, by importance information, that is, how much the local integral contributes to the global integral.

As noted above, the integral described above in connection with Equation (1.7) is over a finite time period T from $t_0$ to $t_0+T$, during which time the shutter of the simulated camera is open. During the time period, if an object in the scene moves, the moving object may preferably be depicted in the image as blurred, with the extent of blurring being a function of the object's motion and the time interval $t_0+T$. Generally, motion during the time an image is recorded is linearly approximated by motion vectors, in which case the integrand in Equation (1.7) is relatively smooth over the time the shutter is open and is suited for correlated sampling. For a ray instance i, started at the subpixel position $x_i$, the offset $\Phi_3(i)$ into the time interval is generated and the $N_T-1$ subsequent samples $$\Phi_3(i) + \frac{j}{N_T}$$

mod 1 are generated for $0<j<N_T$, that is $$t_{i,j} := t_0 \left( \Phi_3(i) \oplus \frac{j}{N_T} \right) \cdot T \qquad (1.18)$$

It will be appreciated that the value of $N_T$ may be chosen to be "one," in which case there will be no subsequent samples for ray instance i. Determining sample points in this manner fills the sampling space, resulting in a more raid convergence to the value of the integral in Equation (1.7). For subsequent trajectory splitting, rays are decorrelated by setting the instance i'=i+j.

In addition to determining the position of the jittered sub-pixel sample point $x_i$, and adjusting the camera and scene according to the sample point $t_{i,j}$ for the time, the computer graphics system also simulates depth of field. In simulating depth of field, the camera to be simulated is assumed to be provided with a lens having known optical characteristics and, using geometrical optics, the subpixel sample point $x_i$ is mapped through the lens to yield a mapped point $x_i'$. The lens is sampled by mapping the dependent samples $$y_{i,j,k} = \left( \left( \Phi_5(i+j, \sigma_5) \oplus \frac{k}{N_L} \right), (\Phi_7(i+j, \sigma_7) \oplus \Phi_2(k)) \right) \qquad (1.19)$$

onto the lens area $A_L$, using a suitable one of a plurality of known transformations. As with $N_T$, the value of $N_L$ may be chosen to be "one." Thereafter, a ray is shot from the sample point on the lens specified by $y_{i,j,k}$ through the point $x_i'$ into the scene. The offset $$(\Phi_5(i+j,\sigma_5), \Phi_7(i+j,\sigma_7))$$

in Equation (1.19) comprises the next components taken from the generalized scrambled Hammersley point set, which, for trajectory splitting, is displaced by the elements $$\left( \frac{k}{N_L}, \Phi_2(k) \right)$$

of the two-dimensional Hammersley point set. The instance of the ray originating from sample point $y_{i,j,k}$ is set of i+j+k in order to decorrelate further splitting down the ray tree. In Equation (1.19), the scrambled samples ($\Phi_5(i+j,\sigma_5)$, $\Phi_7(i+j,\sigma_7)$) are used instead of the unscrambled samples of ($\Phi_5(i+j)$, $\Phi_7(i+j)$) since in bases five and seven, up to five unscrambled samples will lie on a straight line, which will not be the case for the scrambled samples.

In connection with determination of a value for the direct illumination ($T_{f_s+f_s}L_e$ above), direct illumination is represented as an integral over the surface of the scene $\partial V$, which integral is decomposed into a sum of integrals, each over one of the L single area light sources in the scene. The individual integrals in turn are evaluated by dependent sampling, that is $$(T_{f_r-f_s}L_e)(y,z) = \int_{\partial V} L_e(x,y) f_r(x,y,z) G(x,y) dx \qquad (1.20)$$

$$= \sum_{k=1}^{L} \int_{suppL_{e,k}} L_e(x,y) f_r(x,y,z) G(x,y) dx$$

$$\approx \sum_{k=1}^{L} \frac{1}{M_K} \sum_{j=0}^{M_k-1} L_e(x_j, y) f_r(x_j, y, z) G(x_j, y)$$

where $suppL_{e,k}$ refers to the surface of the respective k-th light source. In evaluating the estimate of the integral for the k-th light source, for the $M_k$-th query ray, shadow rays determine the fraction of visibility of the area light source, since the point visibility varies much more than the smooth shadow effect. For each light source, the emission $L_e$ is attenuated by a geometric term G, which includes the visibility, and the surface properties are given by a bidirectional distribution function $f_r$–$f_s$. These integrals are local integrals in the ray tree yielding the value of one node in the ray tree, and can be efficiently evaluated using dependent sampling. In dependent sampling, the query ray comes with the next free integral dimension d and the instance i, from which the dependent samples are determined in accordance with $$x_j = \left( \Phi_{b_d}(i, \sigma_{b_d}) \oplus \frac{j}{M_k}, \Phi_{b_{d+1}}(i, \sigma_{b_{d+1}}) \oplus \Phi_2(j) \right) \qquad (1.21)$$

The offset $$(\Phi_{b_d}(i,\sigma_{b_d}), \Phi_{b_{d+1}}(i,\sigma_{b_{d+1}}))$$

again is taken from the corresponding generalized scrambled Hammersley point set, which shifts the two-dimensional Hammersley point set $$\left( \frac{j}{M_k}, \Phi_2(j) \right)$$

on the light source. Selecting the sample rate Mk=$2^{(j)}$ as a power of two, the local minima are obtained for the discrepancy of the Hammersley point se that perfectly stratifies the light source. As an alternative, the light source can be sampled using an arbitrarily-chosen number $M_k$ of sample points using the following replication rule:

$$\left( \frac{j}{M_k}, \Phi_{M_k}(j, \delta_{M_k}) \right)_{j=0}^{M_k-1}$$

Due to the implicit stratification of the positions of the sample points as described above, the local convergence will be very smooth.

The glossy contribution $T_{f_g}(L-L_e)$ is determined in a manner similar to that described above in connection with area light sources (Equations (1.20) and (1.21)), except that a model $f_g$ used to simulate glossy scattering will be used instead of the bidirectional distribution function $f_r$. In determining the glossy contribution, two-dimensional Hammersley points are generated for a fixed splitting rate M and shifted modulo "one" by the offset $$(\Phi_{b_d}(i,\sigma_{b_d}), \Phi_{b_{d+1}}(i,\sigma_{b_{d+1}}))$$

taken from the current ray tree depth given by the dimension field d of the incoming ray. The ray trees spanned into the scattering direction are decorrelated by assigning the instance fields i'=i+j in a manner similar to that done for simulation of motion blur and depth of field, as described above. The estimates generated for all rays are averaged by the splitting rate M and propagated up the ray tree.

Volumetric effects are typically provided by performing a line integration along respective rays from their origins to the nearest surface point in the scene. In providing for a volumetric effect, the computer graphics system 10 generates from the ray data a corresponding offset $\Phi_{b_d}(i)$ which it then uses to shift the M equidistant samples on the unit interval seen as a one-dimensional torus. In doing so, the rendering time is reduced in comparison to use of an uncorrelated jittering methodology. In addition, such equidistant shifted points typically obtain the best possible discrepancy in one dimension.

Global illumination includes a class of optical effects such as indirect illumination, diffuse and glossy inner-reflections, caustics and color bleeding, that the computer graphics system 10 simulates in generating an image of objects in a scene. Simulation of global illumination typically involves the evaluation of a rendering equation. For the general form of an illustrative rendering equation useful in global illumination simulation, namely:

$$L(\vec{x}, \vec{w}) = L_e(\vec{x}, \vec{w}) +$$

$$\int_{S'} f(\vec{x}, \vec{w} \to \vec{w}) G(\vec{x}, \vec{x}') V(\vec{x}, \vec{x}') L(\vec{x}, \vec{w}') dA' \qquad (1.22)$$

it is recognized that the light radiated it a particular point $\vec{x}$ in a scene is generally sum of two components, namely, the amount of light, if any, that is emitted from the point and the amount of light, if any, that originates from all other points and which is reflected or otherwise scattered from the point $\vec{x}$. In Equation (1.22), $L(\vec{x}, \vec{w})$ represents the radiance at the point $\vec{x}$ in the direction $\vec{w} = (\theta, \phi)$ (where $\theta$ represents the angle of direction $\vec{w}$ relative to a direction orthogonal of the surface of the object in the scene containing the point $\vec{x}$, and $\phi$ represents the angle of the component of direction $\vec{w}$ in a plane tangential to the point $\vec{x}$). Similarly, $L(\vec{x}', \vec{w}')$ in the integral represents the radiance at the point $\vec{x}'$ in the direction $\vec{w}' (\theta', \phi')$ (where $\theta'$ represents the angle of direction $\vec{w}'$ relative to a direction orthogonal of the surface of the object in the scene containing the point $\vec{x}'$, and $\phi'$ represents the angle of the component of direction $\vec{w}'$ in a plane to the point {right arrow over (x)}'), and represents the light, if any, that is emitted from point {right arrow over $\vec{x}'$ which may be reflected or otherwise scattered from point $\vec{x}$.

Continuing with Equation (1.22), $L_e(\vec{x}, \vec{w})$ represents the first component of the sum, namely, the radiance due to emission from the point $\vec{x}$ in the direction $\vec{w}$, and the integral over the sphere S' represents the second component, namely, the radiance due to scattering of light at point $\vec{x}$. $f(\vec{x}, \vec{w}' \to \vec{w})$ is a bidirectional scattering distribution function which describes how munch of the light coming from direction $\vec{w}'$ is reflected, refracted or otherwise scattered in the direction $\vec{w}$, and is generally the sum of a diffuse component, a glossy component and a specular component. In Equation (1.22), the function $G(\vec{x}, \vec{x}')$ is a geometric term $$G(\vec{x}, \vec{x}') = \frac{\cos\theta\cos\theta'}{|\vec{x} - \vec{x}'|^2} \qquad (1.23)$$

where $\theta$ and $\theta'$ are angles relative to the normals of the respective surfaces at points $\vec{x}$ and $\vec{x}'$, respectively. Further in Equation (1.22), $V(\vec{x}, \vec{x}')$ is a visibility function which equals the value one if the point $\vec{x}'$ is visible from the point $\vec{x}$ and zero if the point $\vec{x}'$ is not visible from the point $\vec{x}$.

The computer graphics system 10 makes use of global illumination specifically in connection with determination of the diffuse component $$T_{f_d} T_{f_d} L$$

and the caustic component $$T_{f_d} T_{f_g + f_s} L$$

using a photon map technique. Generally a photon map is constructed by simulating the emission of photons by light source(s) in the scene and tracing the path of each of the photons. For each simulated photon that strikes a surface of an object in the scene, information concerning the simulated photon is stored in a data structure referred to as a photon map, including for example, the simulated photon's color, position, and direction angle. Thereafter a Russian roulette operation is performed to determine the photon's state, i.e., whether the simulated photon will be deemed to have been absorbed or reflected by the surface. If a simulated photon is deemed to have been reflected by the surface, the simulated photon's direction is determined using, for example, a bidirectional reflectance distribution function ("BRDF"). If the reflected simulated photon strikes another surface, these operations will be repeated (see Grabenstein). The data structure in which information for the various simulated photons is stored may have any convenient form; typically k-dimensional trees, for k an integer, are used. After the photon map has been generated, it can be used in rendering the respective components of the image.

In generating a photon map, the computer graphics system 10 simulates photon trajectories, thus avoiding the necessity of discretizing the kernel of the underlying integral equation. The interactions of the photons with the scene, as described above, are stored and used for density estimation. The computer graphics system 10 makes use of a scrambled low-discrepancy strictly-deterministic sequence, such as a scrambled Halton sequence, which has better discrepancy properties in higher dimensions than does an unscrambled sequence. The scrambled sequence also has the benefit, over a random sequence, that the approximation error decreases more smoothly, which will allow for use of an adaptive termination scheme during generation of the estimate of the integral. In addition, since the scrambled sequence is strictly deterministic, generation of estimates can readily be paralleled by assigning certain segments of the low-discrepancy sequence to ones of a plurality of processors, which can operate on portions of the computation independently and in parallel. Since usually the space in which photons will be shot by selecting directions will be much larger than the area of the light sources from which the photons were initially shot, it is advantageous to make use of components of smaller discrepancy, for example, $\Phi_2$ or $\Phi_3$ (where, as above, $\Phi_b$ refers to the radical inverse function for base b), for use in connection with angles at which photons are shot, and components of higher discrepancy, for example, scrambled $\Phi_5$ or $\Phi_7$, for use in connection with sampling of the area of the respective light source, which will facilitate filling the space more uniformly.

The computer graphics system 10 estimates the radiance from the photons in accordance with $$\overline{L}_r(x,\omega) \approx \frac{1}{A} \sum_{i \in B_k(x)} f_r(\omega_i; x, \omega) \Phi_i \qquad (1.24)$$

where, in Equation (1.24), $\Phi_i$ represents the energy of the respective i-th photon, $\omega_i$ is the direction of incidence of the i-th photon $B_k(x)$ represents the set of the k nearest photons around the point x, and A represents an area around point x that includes the photons in the set $B_k(x)$ Since the energy of a photon is a function of its wavelength, the $\Phi_i$ in Equation (1.24) also represents the color of the respective i-th photon. The computer graphics system 10 makes use of an unbiased but consistent estimator for the area A for use in Equation (1.24), which is determined as follows. Given a query ball, that is, a sphere that is centered at point x and whose radius r $(B_k(x))$ is the minimal radius necessary for the sphere to include the entire set $B_k(x)$, a tangential disk D of radius r $(B_k(x))$ centered on the point x is divided into M equal-sized subdomains $D_i$, that is $$\bigcup_{i=0}^{M-1} D_i = D \text{ and } D_i \cap D_j \neq 0 \text{ for } i \neq j \qquad (1.25)$$

where $$|D_i| = \frac{|D|}{M} = \frac{\pi^2(B_k(x))}{M}$$

The set $$P = \{D_i | D_i \cap \{x_i|_D | i \in B_k(x)\} \neq 0\} \qquad (1.26)$$

contains all the subdomains $D_i$ that contain a point $x_i|_D$ on the disk, which is the position of the i-th photon projected onto the plane defined by the disk D along its direction of incidence $\omega_i$. Preferably, the number M of subdomains will be on the order of $\sqrt{k}$ and the angular subdivision will be finer than the radial subdivision in order to capture geometry borders. The actual area A is then determined by $$A = \pi r^2(B_k(x)) \frac{|P|}{M} \qquad (1.27)$$

Determining the actual coverage of the disk D by photons significantly improves the radiance estimate in Equation (1.24) in corners and on borders, where the area obtained by the standard estimate $\pi r^2(B_k(x))$ would be too small, which would be the case at corners, or too large, which would be the case at borders. In order to avoid blurring of sharp contours of caustics and shadows, the computer graphics system 10 sets the radiance estimate L to black if all domains $D_i$ that touch point x do not contain any photons.

It will be appreciated that in regions of high photon density, the k nearest photons may lead to a radius r $(B_k(x))$ that is nearly zero, which can cause an over-modulation of the estimate. Over-modulation can be avoided by selecting a minimum radius $r_{min}$, which will be used if r $(B_k(x))$ is less than $r_{min}$. In that case, instead of Equation (1.24), the estimate is generated in accordance with the following equation:

$$\overline{L}_r(x,\omega) = \frac{N}{k} \sum_{i \in B_k(x)} \Phi_i f_r(\omega_i, x, \omega_r) \qquad (1.28)$$

assuming each photon is started with 1/N of the total flux $\Phi$. The estimator in Equation (1.28) provides an estimate for the mean flux of the k photons if $r(B_k(x)) < r_{min}$.

The global photon map is generally rather coarse and, as a result, subpixel samples can result in identical photon map queries. As a result, the direct visualization of the global photon map is blurry, and it is advantageous to perform a smoothing operation in connection therewith In performing such an operation, the computer graphics system 10 performs a local pass integration that removes artifacts of the direct visualization. Accordingly, the computer graphics system 10 generates an approximation for the diffuse illumination term $T_{f_d}T_{f_d}L$ as $$T_{f_d}T_{f_d}L \approx (T_{f_d}L_r)(x) \qquad (1.29)$$

$$= \int_{S^2(x)} f_d(x)\overline{L}_r(h(x,\vec{\omega}))\cos\theta d\omega$$

$$\approx \frac{f_d(x)}{M} \sum_{i=0}^{M-1} \overline{L}_r(h(x, \omega(\arcsin\sqrt{u_{i,1}}, 2\pi u_{i,2})))$$

with the integral over the hemisphere $S^2(x)$ of incident directions aligned by the surface normal in x being evaluated using importance sampling. The computer graphics system 10 stratifies the sample points on a two-dimensional grid by applying dependent trajectory splitting with the Hammersley sequence and thereafter applies irradiance interpolation. Instead of storing the incident flux $\Phi_i$ of the respective photons, the computer graphics system 10 stores their reflected diffuse power $f_d(x_i)\Phi_i$ with the respective photons in the photon map, which allows for a more exact approximation than can be obtained by only sampling the diffuse BRDF in the hit points of the final gather rays. In addition, the BRDF evaluation is needed only once per photon, saving the evaluations during the final gathering. Instead of sampling the full grid, the computer graphics system 10 uses adaptive sampling, in which refinement is triggered by contrast distance traveled by the final gather rays in order to more evenly sample the projected solid angle, and the number of photons that are incident form the portion of the projected hemisphere. The computer graphics system 10 fills in positions in the grid that are not sampled by interpolation. The resulting image matrix of the projected hemisphere is median filtered in order to remove weak singularities, after which the approximation is generated. The computer graphics system 10 performs the same operation in connection with, for example, hemispherical sky illumination, spherical high dynamic-range environmental maps, or any other environmental light source.

The computer graphics system 10 processes final gather rays that strike objects that do not cause caustics, such as plane glass windows, by recursive ray tracing. If the hit point of a final gather ray is closer to its origin than a predetermined threshold, the computer graphics system 10 also performs recursive ray tracing. This reduces the likelihood that blurry artifacts will appear in corners, which might otherwise occur since for close hit points the same photons would be collected, which can indirectly expose the blurry structure of the global photon map.

Generally photon maps have been taken as a snapshot at one point in time, and thus were unsuitable in connection with rendering of motion blur. Following the observation that averaging the result of a plurality of photon maps is generally similar to querying one photon map with the total number of photons from all of the plurality of photon maps, the computer graphics system 10 generates $N_T$ photon maps, where $N_T$ is determined as described above, at points in time $$t_b = t_0 + \frac{b + \frac{1}{2}}{N_T} T \qquad (1.30)$$

$0 \leq b < N_T$. As noted above, $N_T$ can equal "one," in which case N photon maps are used, with N being chosen as described above. In that case, $$t_i = t_0 + \Phi_3(i)T \qquad (1.31)$$

and thus $t_{i,j} = t_{i,0}$, that is, $t_i$, for $N_T = 1$. In the general case (Equation 1.30)), during rendering, the computer graphics system 10 uses the photon map with the smallest time difference $|t_{i,j} - t_b|$ in connection with rendering for the time sample point $t_{i,j}$.

The invention provides a number of advantages. In particular, the invention provides a computer graphics system that makes use of strictly deterministic distributed ray tracing based on low-discrepancy sampling and dependent trajectory splitting in connection with rendering of an image of a scene. Generally, strictly deterministic distributed ray tracing based on deterministic low-discrepancy sampling and dependent trajectory splitting is simpler to implement than an implementation based on random or pseudo-random numbers. Due to the properties of the radical inverse function, stratification of sample points is intrinsic and does not need to be considered independently of the generation of the positions of the sample points. In addition, since the methodology is strictly deterministic, it can be readily parallelized by dividing the image into a plurality of tasks, which can be executed by a plurality of processors in parallel. There is no need to take a step of ensuring that positions of sample points are not correlated, which is generally necessary if a methodology based on random or pseudo-random numbers is to be implemented for processing in parallel.

Moreover, the methodology can be readily implemented in hardware, such as a graphics accelerator, particularly if Hammersley point sets are used, since all points with a fixed index i yield a regular grid. A graphics accelerator can render a plurality of partial images corresponding to these regular grids in a number of parallel tasks, and interleave the partial images in an accumulation buffer to provide the final image. Operating in this manner provides very good load balancing among the parallel tasks, since all of the tasks render almost the same image.

In addition, the methodology can readily be extended to facilitate rendering of animations. Generally, at animation consists of a series of frames, each frame comprising an image. In order to decorrelate the various frames, instead of initializing the field of integers used as identifiers for ray instances for each frame by i, $i + i_f$ can be used, where $i_f$ is a frame number. This operates as an offsetting of i by $i_f$, which is simply a generalization of the Hammersley points. A user can select to initialize the field of integers for each frame by i, in which case the frames will not be correlated. In that case, undersampling artifacts caused by smooth motion will remain local and are only smoothly varying. Alternatively, the user can select to initialize the field of integers for each frame by $i + i_f$, in which case the artifacts will not remain local, and sill instead appear as noise or film grain flicker in the final animation. The latter is sometimes a desired feature of the resulting animation, whether for artistic reasons or to match actual film grain. Another variation is to add $i_f$ directly to k and clip the results $2^n$ (reference Code Segment 1, below). In that case, the pixel sampling pattern will change from frame to frame and the frame number $i_f$ will need to be known in the post-production process in order to reconstruct the pixel sampling pattern for compositing purposes.

Generally, a computer graphics system that makes use of deterministic low-discrepancy sampling in determination of sample points will perform better than a computer graphics system that makes use of random or pseudo-random sampling, but the performance may degrade to that of a system that makes use of random or pseudo-random sampling in higher dimensions. By providing that the computer graphics system performs dependent splitting by replication, the superior convergence of low-dimensional low-discrepancy sampling can be exploited with the effect that the overall integrand becomes smoother, resulting in better convergence than with stratified random or pseudo-random sampling. Since the computer graphics system also makes use of dependent trajectory sampling by means of infinite low discrepancy sequences, consistent adaptive sampling of, for example, light sources, can also be performed.

In addition, it will be appreciated that, although the computer graphics system has been described as making use of sample points generated using generalized scrambled and/or unscrambled Hammersley and Halton sequences, it will be appreciated that generally any (t,m,s)-net or (t,s)-sequence can be used.

At a more general level, the invention provides an improved quasi-Monte Carlo methodology for evaluating an integral of a function $f$ on the s-dimensional unit cube $[0,1)^S$. In contrast with this methodology, which will be referred to as trajectory splitting by dependent splitting, in prior methodologies, the sample points in the integration domain for which the sample values at which sample values for the function were generated were determined by providing the same number of coordinate samples along each dimension. However, for some dimensions of an integrand, it is often the case that the function $f$ will exhibit a higher variance than for other dimensions. The invention exploits this by making use of trajectory splitting by dependent samples in critical regions.

The partial integral $$g(x) = \int_{I^{s_2}} f(x, y) dy \approx \frac{1}{N_2} \sum_{j=0}^{N_2 - 1} f(x, y_j) \qquad (1.32)$$

(x and y comprising disjoint sets of the s-dimensions, and s∪y comprising the set of all of the dimensions), where $N_2$ identifies the number of samples selected for the set y of dimensions, can be defined over the portion of the integration domain that is defined by unit cube $(0,1]^{s_2}$, which, in turn, corresponds to the portion of the integration domain that is associated with set $s_2$ dimensions. Evaluating g(x) using Equation (1.32) will affect a smoothing of the function $f$ in the $s_2$ dimensions that are associated with set y.

The result generated by applying Equation (1.32) can then be used to evaluate the full integral $$\int_{I^{s_1}} \int_{I^{s_2}} f(x, y) dy dx = \int_{I^{s_1}} g(x) dx \quad (1.33)$$

$$\approx \frac{1}{N_1} \sum_{i=0}^{N_1-1} \frac{1}{N_2} \sum_{j=0}^{N_2-1} f(x_i, y_j)$$

where $N_1$ identifies the number of samples selected for the set x of dimensions, that is, over the remaining dimensions of the integration domain that are associated with the $s_1$ dimensions that are associated with the set x. If the dimension splitting x,y is selected such that the function $f$ exhibits relatively high variance over the set y of the integration domain, and relatively low variance over the set x, it will not be necessary to generate sample values for the function $N_1$-times-$N_2$ times. In that case, it will suffice to generate sample only values $N_2$ times over the integration domain. If the correlation coefficient of $f(\xi, \eta)$ and $f(\xi, \eta')$, which indicates the degree of correlation between values of function evaluated, for the former, at $(x_i, y_i) = (86, \eta)$, and, for the later, at b $(x_i, y_i) = (\xi, \eta')$, is relatively high, the time complexity required to evaluate the function $$f_{[0,1)}(x_0, \ldots, x_{s-1})$$

will be decreased.

The smoothness of an integrated can be exploited using a methodology, that will be referred to as correlated sampling. Generally, that is, if correlated sampling is not used, in evaluating an integral, each dimension will be associated with its respective sequence. However, in correlated sampling, the same sequence can be used for all of the dimensions over the integration domain, that is $$\frac{1}{M} \sum_{j=1}^{N} \frac{1}{N_j} \sum_{i=0}^{N_j-1} f_j(x_i, y_j) \approx \frac{1}{M} \sum_{j=1}^{M} \int_{I^s} f_j(x) dx \quad (1.34)$$

$$= \int_{I^s} \frac{1}{M} \sum_{j=1}^{M} f_j(x) dx$$

$$\approx \frac{1}{N} \sum_{i=-}^{N-1} \frac{1}{M} \sum_{j=1}^{M} f_j(x_i)$$

The methodology of trajectory splitting by depending sampling makes use of a combination of the trajectory splitting technique described above in connection with Equations (1.32) and (1.33) with the correlated sampling methodology described in connection with Equation (1.34).

Since integrals are invariant under toroidal shifting for $z_j \in I^{s_2}$, that is, $$S_j: I^{s_2} \to I^{s_2} \quad \Rightarrow \int_{I^{s_2}} g(y) dy = \int_{I^{s_2}} g(S_j(y)) dy \quad (1.35)$$
$$y \mapsto (y + z_j) \bmod 1$$

the values of the integrals also do not change, Thus, if, in Equation (1.33), the inner integral is replicated M times, $$\int_{I^{s_1}} \int_{I^{s_2}} f(x, y) dy dx = \int_{I^{s_1}} \int_{I^{s_2}} \frac{1}{M} \sum_{j=0}^{M-1} f(x, S_j(y)) dy dx \quad (1.36)$$

$$\approx \frac{1}{N} \sum_{i=0}^{N-1} \frac{1}{M} \sum_{j=0}^{M-1} f(x_i, S'_j(y_i))$$

$$= \frac{1}{N} \sum_{i=0}^{N-1} \frac{1}{M} \sum_{j=0}^{M-1} f(x_i, (y_i + z_j) \bmod 1)$$

For index j, the functions $f(x_i, S_j(y_i))$ are correlated, enabling the smoothness of the integrand in those dimensions that are represented by y to be exploited, as illustrated above in connection with Equation (1.19) (lens sampling), Equations (1.20) and (1.21) (area light sources) and Equation (1.29) (approximation for the diffuse illumination term). It will be appreciated that the evaluation using the replication is the repeated application of the local quadrature rule $$U_{M,s_s} := (z_j)_{j=0}^{M}$$

shifted by random offset values $y_i$. The use of dependent variables in this manner pays off particularly if there is some smoothness in the integrated along one or more dimensions. Splitting can be applied recursively, which yields a history tree, in which each path through the respective history tree represents a trajectory of a particle such as a photon.

The quasi-Monte Carlo methodology of trajectory splitting by dependent sampling makes use of sets of deterministic, low-discrepancy sample points both for the global quadrature rule $$U_{N,s_1+s_2} = (x_i, y_i)_{i=0}^{N}$$

that is, integration over all of the dimensions $s_1+s_2$ comprising the entire integration domain as well as for the local quadrature rule $$U_{M,S_s} := (z_j)_{j=0}^{M}$$

that is, integration over the dimensions $s_2$ of the integration domain. The methodology unites splitting and dependent sampling, exploiting the stratification properties of low-discrepancy sampling. Accordingly, it will be possible to concentrate more samples along those dimensions in which the integrand exhibits high levels of variation, and fewer samples along those dimensions in which the integrand exhibits low levels of variation, which reduces the number of sample points at which the function will need to be evaluated. If the methodology is to be applied recursively a plurality of times, it will generally be worthwhile to calculate a series of values $z_j$ that are to comprise the set $U_{M,S_2}$. In addition, the methodology may be used along with importance sampling and, if U is an infinite sequence, adaptive sampling. In connection with adaptive sampling, the adaptations will be applied in the replication independently of the sampling rate, so that the algorithm will remain consistent. The low-discrepancy sample points set $U_{n,s_1+s_2}$ and $U_{M,s_2}$ can be chosen arbitrarily; for example, the sample point set $U_{M,s_2}$ can be a projection of sample point set $U_{N,s_1+s_2}$. When trajectory splitting is recursively applied to build trajectory trees, generalizing the point set $U_{N,s_1+s_2}$ for the subsequent branches can be used to decorrelate the separate parts of the respective tree.

FIG. 5 shows a code fragment 140, referred to herein as "Code Segment 1," in the C++ programming language for generating the positions of the jittered subpixel sample, points $x_i$. FIG. 6 shows a code fragment 142, referred to herein as "Code Segment 2," in the C++ programming language for generating a ray tree class Ray.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

With these points in mind, we next turn to image synthesis by adaptive quasi-Monte Carlo integration.

II. Image Synthesis by Adaptive Quasi-Monte Carlo Integration

Analyzing the implicit stratification properties of the deterministically scrambled Halton sequence leads to an adaptive interleaved sampling scheme that improves many rendering algorithms. Compared to uncorrelated adaptive random sampling schemes, the correlated and highly uniform sample points from the incremental Halton sequence result in a faster convergence and much more robust adaptation. Since the scheme is deterministic, parallelization and reproducibility become trivial, while interleaving maximally avoids aliasing. The sampling scheme described herein are useful in a number of applications including, for example, industrial path tracing, distribution ray tracing, and high resolution compositing.

As discussed above, the process of image synthesis includes computing the color of each pixel in the image. The pixel color itself is determined by an integral. Due to high dimensionality and unknown discontinuities of the integrand, this integral typically must be approximated using a numerical technique, such is the Monte Carlo method. The efficiency of the image synthesis process can be significantly improved by using adaptive schemes that take into account variations in the complexity of the integrands.

Analytical integration methods developed for computer graphics perform very well for small problems, i.e., low integrand dimension or untextured scenes. Approaches like discontinuity meshing or approximate analytical integration, however, utterly fail for, e.g., higher order shadow effects. Consequently, high-end rendering algorithms rely on sampling.

Starting from early computer graphics, many adaptive sampling schemes have been developed in order to control rendering effort. A number of these schemes rely on partitioning the integration domain along each axis. As long as only low-dimensional integration (e.g., pixel anti-aliasing) was of interest, the inherent curse of dimension of axis-aligned recursive refinement was not perceptible. (The term "curse of dimension" refers to the known issue that computational cost typically increases exponentially with the dimension of a problem.) These schemes are still applied today. However, due to the curse of dimension, for example, in distribution ray tracing and global illumination simulation, these schemes are applied only to the lowest dimensions of the integrands, e.g., to the image plane.

Many adaptive schemes rely on comparing single samples in order to control refinement. For example edges are detected by comparing contrast against a threshold. Such schemes fail in two aspects. If the contrast does not indicate refinement, nevertheless important contributions to the image can be missed. On the other hand refinement can be taken too far. This happens, for example, when sampling an infinite black-and-white checkerboard in perspective. At the horizon, refinement is driven to full depth, although the correct gray pixel color may already be obtained by one black and white sample.

In fact, the paradigm of sample-based refinement performs function approximation of the integrand itself, although only averages of the integrand are required. This is considered by pixel-selective Monte Carlo schemes that consider the estimated variance of the estimate of the functional to be computed. However, Monte Carlo error estimation requires independent random samples, which limits the amount of uniformity of the samples and thus convergence speed.

Thinking of adaptive sampling as image processing it is easy to identify noise or edges in an image by computing derivatives between pixels in order to trigger refinement.

By considering image synthesis as computing families of functionals instead of independent pixel values only, a powerful adaptive sampling scheme has been developed. Therefore stratified sequences of sample points are extracted from the scrambled Halton sequence. Although these points are deterministic, aliasing is avoided maximally. Incorporating tone mapping directly into the pixel integral, in addition to high uniformity of the subsequences, yields a superior and smooth convergence. Consequently adaptation can be controlled robustly by applying simple image processing operators to the final pixel values rather than to single samples. Since everything is deterministic exact reproducibility as required in production is trivial. The superior performance of the new technique is described below with respect to various applications.

The scrambled Halton sequence is now described. For the purposes of the present discussion, filtering, tone mapping, and actual radiance computations are hidden in the integrand $f$ defined on the s-dimensional unit cube. The color of a pixel is then determined by an integral $$\int_{[0,1)^s} f(x)dx \approx \frac{1}{N}\sum_{j=0}^{N-1} f(x_j)$$

which is numerically is approximated by averaging N function samples at the positions $x_j \in [0,1)^s$.

It has been demonstrated non-adaptive quasi-Monte Carlo integration is highly efficient in computer graphics. The used so-called quasi-Monte Carlo points are of low discrepancy, meaning that due to high correlation they are much more uniformly distributed than random samples can be. Due to their deterministic nature, however, unbiased error estimation from the samples themselves is not possible opposite to the Monte Carlo method.

In order to take advantage of the much faster and smoother convergence of quasi-Monte Carlo integration and to obtain a reliable adaptation control, important properties of the scrambled Halton sequence are described in the following discussion. This deterministic low discrepancy point is easily constructed as can be seen in the sample code, discussed below.

"Stratification by radical inversion" is now described. The radical inverse $$\Phi_b: \mathbb{N}_0 \to \mathbb{Q} \cap [0, 1) \qquad (2.1)$$

$$i = \sum_{l=0}^{\infty} a_l(i) b^l \mapsto \sum_{l=0}^{\infty} a_l b^{-l-1}$$

mirrors the representation of the index i by the digits $$a_l(i) \in \{0, \ldots, b-1\}$$

in the integer base $b \in \mathbb{N}$ at the decimal point. In base b=2, this means that $$\Phi_2(i) \in \begin{cases} [0, 1/2) & \text{for } i \text{ even,} \\ [1/2, 1) & \text{else.} \end{cases} \qquad (2.2)$$

This observation has been generalized, and given the name periodicity. In fact, however, this property relates much more to stratification as formalized by the definition of (0,1)-sequences. Therefore, a different derivation is presented herein that stresses the actual stratification property. The index i is chosen as $$i = j \cdot b^n + k \text{ for } k \in \{0, \ldots, b^n - 1\}$$

and inserted into Equation (2.1) yielding $$\Phi_b(i) = \Phi_b(j \cdot b^n + k) \qquad (2.3)$$

$$= \sum_{l=0}^{\infty} a_l(j \cdot b^n + k) b^{-l-1}$$

$$= \sum_{l=0}^{\infty} a_l(j \cdot b^n) b^{-l-1} + \sum_{l=0}^{\infty} a_l(k) b^{-l-1}$$

$$= \sum_{l=0}^{\infty} a_l(j) b^{-n-l-1} + \Phi_b(k)$$

$$= \underbrace{b^{-n} \Phi_b(j)}_{\in [0, b^{-n})} + \Phi_b(k)$$

by exploiting the additivity of the radical inverses that belong to the class of (0, 1)-sequences. The first term of the result depends on j and obviously is bounded by $b^{-n}$, while the second term is a constant offset by the radical inverse of k. Since $$k \in \{0, \ldots b^x - 1\}$$

it follows that $$\Phi_k \in \{0, b^{-n}, 2b^{-n}, \ldots (b^n - 1) b^{-n}\}$$

Fixing the n first digits by k then for $j \in \mathbb{N}_0$ 2 yields radical inverses only in the interval $$[\Phi_b(k), \Phi_b(k) + b^{-n})$$

There are now described stratified samples from the Halton sequence. For quasi-Monte Carlo integration, multidimensional uniform samples are required. However, from Equation (2.2) it may be seen that the radical inverse is not completely uniformly distributed, i.e., cannot just replace the random number generator. Therefore, multidimensional uniform deterministic samples may be constructed, for example, by the Halton sequence $$x_i = (\Phi_{b_1}(i), \ldots, \Phi_{b_s}(i)) \in [0, 1)^s$$

where for the c-th component $b_c$ is the c-th prime number.

The one-dimensional observations above generalize to higher dimensions. Stratified sampling is implicitly embodied. This is seen by choosing the index $$i = j \cdot \prod_{d=1}^{s} b_d^{n_d} + k \text{ with } 0 \le k < \prod_{d=1}^{s} b_d^{n_d} \qquad (2.4)$$

yielding $$\Phi_{b_c}(i) = \Phi_{b_c}\left(j \cdot \prod_{d=1}^{s} b_d^{n_d} + k\right)$$

$$= b_c^{-n_c} \Phi_{b_c}\left(j \cdot \prod_{\substack{d=1 \\ d \ne c}}^{s} b_d^{n_d}\right) + \Phi_{b_c}(k)$$

analogous to Equation (2.3), and consequently $$x_i \in \prod_{c=1}^{s} [\Phi_{b_c}(k), \Phi_{b_c}(k) + b_c^{-n_c})$$

for fixed k and $j \in \mathbb{N}_0$ with the choice of the index i according to Equation (2.4). It may be seen that the $$\Pi_{d=1}^{s} b_d^{n_d}$$

disjoint strata selected by k are disjoint and form a partition of the unit cube $[0, 1)^s$. However, the scheme suffers the curse of dimension, since stratifying all s dimensions results in an exponential growth of the number of strata. This may be the reason, why only the first four dimensions have been stratified.

The stratification property is illustrated in FIGS. 7A and 7B, which show plots 200 and 210, respectively, of the first two components $x_i = (\Phi_2(i), \Phi_3(i))$ of the Halton sequence for $0 \le i < j \cdot 6 + k < 2^4 \cdot 3^3 = 216$. The stratum with the emphasized points contains all indices i with k=1. Scaling the strata to be square, i.e., $$x_i \to x_i^n = (2^1 \cdot \Phi_2(i), 3^1 \cdot \Phi_3(i))$$

does not affect discrepancy, since it is a separable mapping

Deterministic scrambling is now described. The Halton sequence exposes superior uniformity properties, i.e., low discrepancy and minimum distance property. However, low-dimensional projections exhibit correlation patterns. FIGS. 8A and 8B show a pair of low-dimensional projections 220 and 230. FIG. 8A shows the Halton sequence for the points $$(\Phi_{17}(i), \Phi_{19}(i))_{i=0}^{255}$$

FIG. 8B shows the scrambled Halton sequence for the points $$(\Phi_{17}'(i), \Phi_{19}'(i))_{i=0}^{255}$$

As illustrated by FIGS. 8A and 8B, scrambling can significantly improve uniformity.

While usually not perceptible, this low-dimensional correlation often interferes with the integrands in computer graphics that have low-dimensional structure. For example, correlation can slow down convergence in a sequence of two-dimensional scattering events as used in path tracing.

One remedy is to scramble the Halton sequence. The radical inverse is replaced by the scrambled radical inverse $$\Phi'_b : \mathbb{N}_0 \to \mathbb{Q} \cap [0, 1) \qquad (2.5)$$

$$i = \sum_{l=0}^{\infty} a_l(i) b^l \mapsto \sum_{l=0}^{\infty} \pi_b(a_l(i)) b^{-l-1}$$

yielding a scrambled Halton sequence $$x_i' := (\Phi'_{b_1}(i), \ldots, \Phi'_{b_s}(i))$$

The scrambling permutations $\pi_b$ applied to the digits $a_l(i)$ are determined by a recursion starting with the identity $\pi_2 = (0,1)$. If b is odd, $\pi_b$ is constructed from $\pi_{b-1}$ by incrementing each value $\geq b-1/2$ and inserting b−1/2 in the middle. Otherwise, $\pi_b$ is constructed from $\pi_{b-1}$ by concatenating $$2\pi_{b/2}$$

and $$2\pi_{b/2}+1$$

This algorithm yields $$\pi_2 = (0,1)$$

$$\pi_3 = (0,1,2)$$

$$\pi_4 = (0,2,1,3)$$

$$\pi_5 = (0,3,2,1,4)$$

$$\pi_6 = (0,2,4,1,3,5)$$

$$\pi_7 = (0,2,5,3,1,4,6)$$

$$\pi_8 = (0,4,2,6,1,5,3,7)$$

The scrambling improves the uniformity. This is especially visible for low-dimensional projections as illustrated in FIGS. 8A and 8B. In addition, the minimum distance of samples is increased, which indicates an increased uniformity. An implementation is described below.

The observations from Equation (2.3) and from the above discussion transfer to the scrambled Halton sequence in a straightforward way. This can be seen for two-dimensional stratification, since $\pi_2$ and $\pi_3$ are identities and consequently $$\Phi'_2 = \Phi_2$$

and $$\Phi'_3 = \Phi_3$$

There is now described a technique for bias elimination by randomization. By construction, radical inversion generates only rational numbers $\mathbb{Q} \cap [0,1)$ as set forth in Equations (2.1) and (2.5). Nevertheless, it can be shown that quasi-Monte Carlo integration is biased but consistent for Riemann-integrable functions.

If required, the bias can be removed by randomly shifting the deterministic points $$x_{i'=xi'}+\xi \bmod 1 := (\Phi'_{b_1}(i)+\xi^{(1)} \bmod 1, \ldots, \Phi'_{b_s}(i)+\xi^{(s)} \bmod 1)$$

of the scrambled Halton sequence modulo one, where $$\xi = (\xi^{(1)}, \ldots, \xi^{(s)}) \in [0,1)^s$$

is a vector of s independent realizations of uniform numbers on the unit interval. The resulting minimally randomized estimator has been analyzed, and a variance reduction of $$\sigma^2 \left( \frac{1}{N} \sum_{i=0}^{N-1} f(x_i' + \xi \bmod 1) \right) = O\left( \frac{\ln^{2s} N}{N^2} \right)$$

has been proofed for square integrable functions. Multiple realizations of this and other randomization techniques allow the estimation of the variance in order to control the integration error. Since the error is controlled in a different way, one instance of such a randomization is sufficient to cancel the bias. However, in fact, the bias of the scrambled Halton sequence compared to the randomly shifted points, and consequently the randomization becomes negligible.

Considering random scrambling leads to a second important observation. Often the uniformity of the samples is improved; however, some realizations also can decrease the uniformity of a point set by, e.g., lowering the mutual minimum distance. Our experiments show that random scrambling only marginally changes the uniformity of the scrambled Halton sequence, indicating that the deterministic permutations $\pi_b$, which are themselves a subset of the permutations available for random scrambling, already are a very good choice. In addition implementing the scrambled Halton sequence, as described below, is simpler than random scrambling.

From the above observations, it can be concluded that randomization in not necessary for the presently described applications. The structure of the deterministic scrambled Halton sequence is described below with respect to specific implementations.

A new technique for image synthesis is now described. Image synthesis includes computing a matrix of pixel colors $$I_{m,n} := \int_{[0,1]^s} f_{m,n}(x) dx \qquad (2.6)$$

$$\approx \sum_{j=0}^{N_{m,n}-1} w_{j,m,n} R_\alpha(L(x_{j,m,n}))$$

The function $f_{m,n}$ to be integrated for the pixel at position (m, n) usually contains discontinuities and can be of high dimension. Efficient general analytical solutions are not available and consequently the integrals have to be numerically approximated. In addition the complexity of the integrands varies so that adaptive integration pays off.

Figure 9:
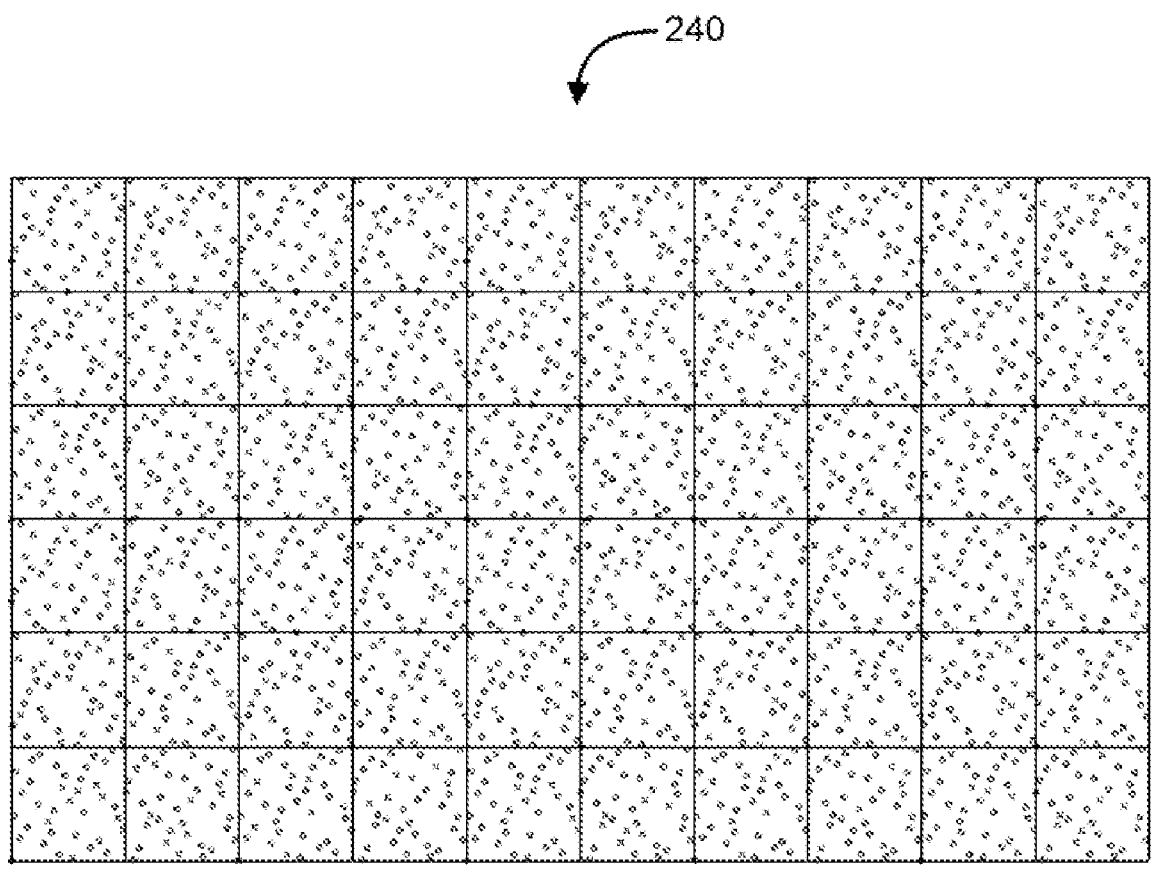
FIG. 9 shows a plot of a sample pattern that is tiled over the image plane.

Deterministic anti-aliasing is now described. The first component $x_i^{(1)}$ is scaled by $b_1^{n_1}$ and the second $x_i^{(2)}$ by $b_2^{n_2}$ as illustrated in FIGS. 7A and 7B. Thus, a $b_1^{n_1} \times b_2^{n_2}$ stratified sample pattern is obtained that is periodically tiled over the image plane. FIG. 9 shows a plot 240 of the tiled sample pattern.

Identifying each stratum with a pixel, the identification k is determined, for example by a table lookup, from the pixel coordinates, and a Halton sequence restricted to that pixel is obtained from $$i = j \cdot b_1^{n_1} \cdot b_2^{n_2} + k \text{ or } j \in N_0$$

This restriction means fixing the first $n_1$ and $n_2$ decimal digits of the first and second component, respectively, and does not change the superior uniformity properties of the Halton points. Consequently, the improved and smooth convergence of deterministic low discrepancy sampling is preserved. Convergence is improved substantially further by applying tone-mapping techniques that in fact bound the integrands. Then, adaptation triggered by image processing operators becomes very reliable. The number of strata $b_1^{n_1} \times b_2^{n_2}$ is determined by $n_1$ and $n_2$, which are chosen large enough, so that the strata covered by adjacent pixel reconstruction filters do not contain repeated patterns.

While for Monte Carlo integration it is easy to control adaptation by estimating the integration error from the samples, this is not possible for the correlated samples of quasi-Monte Carlo integration.

A pixel is refined, whenever a refinement criterion is met. As an example, a simple criterion indicates refinement by checking the image gradient $$\|\nabla I_{m,n}\| > T \cdot N_{m,n}$$

against a threshold T. The exponent $\alpha \in [0.5, 1.5]$ can be used to adapt to the speed of convergence. $N_{m,n}$ is the number of samples used for pixel (m, n).

As know from music equipment, clipping signals causes distortion. Therefore, instead of clipping, compression is used, meaning that an upper bound on the signal is achieved by using a continuously differentiable function. In addition, single signals are compressed before being mixed.

According to an aspect of the invention, the same is done for image synthesis. In Equation (2.6), the luminance L is compressed by $$R_\alpha : \mathbb{R}_0^+ \to [0,1]$$

$$L \mapsto \begin{cases} L & L < \alpha \\ \alpha + (1-\alpha)\dfrac{L-\alpha}{1+L-\alpha} & \text{else} \end{cases}$$

before averaging. By $\alpha \in [0,1]$, it is possible to blend between linear transfer that is clipped at $\alpha=1$ and compression for $\alpha=0$. The derivative of $$\frac{x}{1+x}$$

in x=0 and such the mapping $R_\alpha$ is continuously differentiable. Depending on the output media, many other response curve mappings $R_\alpha$ are possible such as, for example, the sRGB compression for video displays or film material characteristics.

Performing the tone-mapping, i.e., compression, directly in the quadrature is a remedy to the overmodulation problems from, e.g., reflections or light source samples, and consequently convergence is increased because the integrands are bounded now. Thus, the noise level is reduced, contrary to the gradient domain method and advanced filter kernel construction becomes necessary.

In applying the above-described techniques to synthesize an image, more samples are used to resolve certain details in the final image. Adaptive samples are generated by refining the Halton sequence in the first two dimensions by some contrast criterion in screen space.

The above-described technique has a number of different applications, including high-resolution compositing, frameless rendering, and parallelization.

Based on the stratification properties of radical inversion a new adaptive integration algorithm for image synthesis has been presented. Using the stratification for interleaving, aliases are efficiently suppressed, while the smooth convergence of low-discrepancy sequences allows one to use a very efficient and robust termination criterion for adaptation. Since all sample positions are deterministic, storing the sampled function values allows high-resolution compositing. In a similar way, the convergence can be improved by using the microstructure of a (t, s)-sequence, such as, for example, the Sobol sequence. While the described techniques benefit from stratification in only two dimensions, it is not suited for general high-dimensional stratification due to the curse of dimension.

Figure 10:
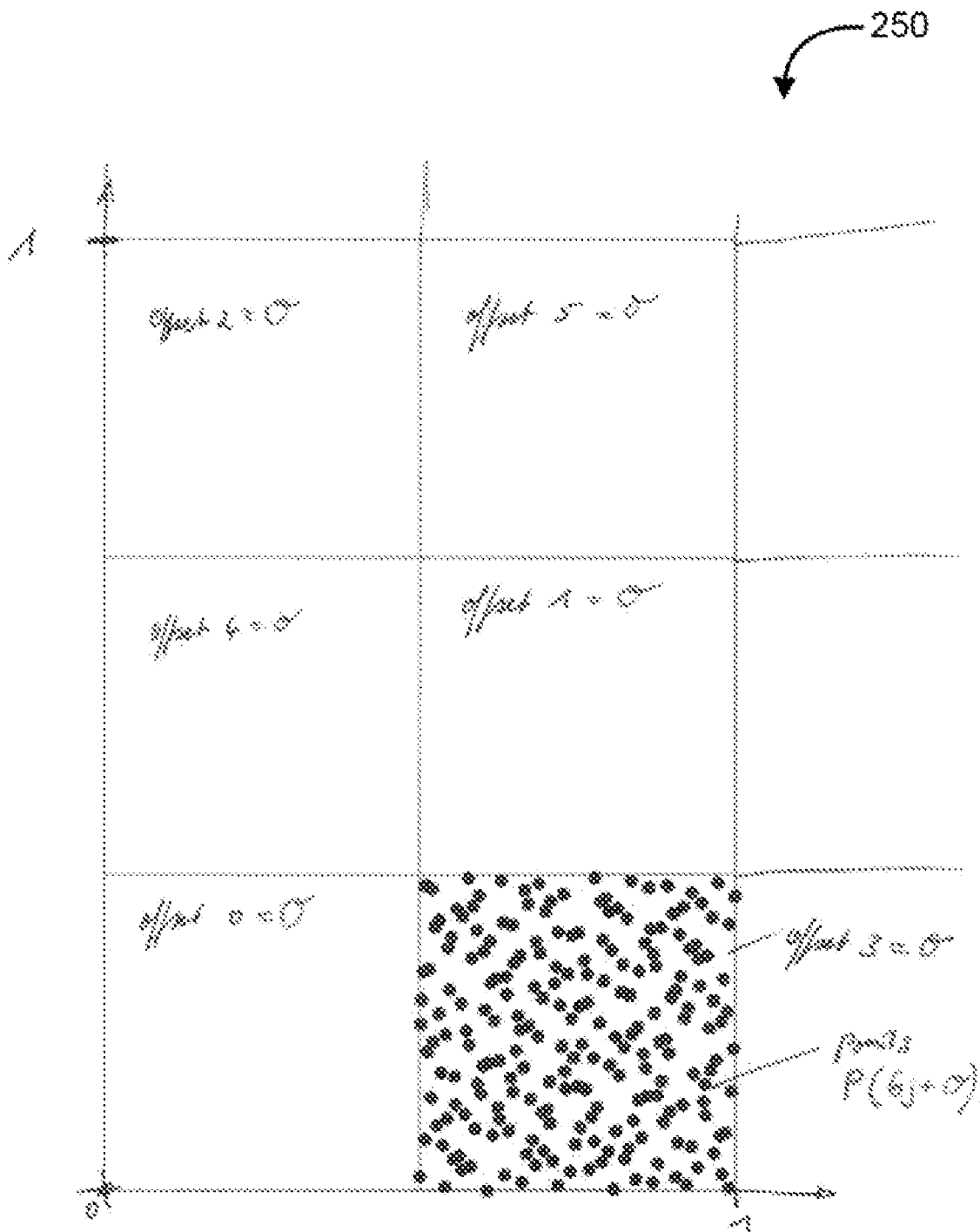
FIG. 10 shows a plot illustrating an interleaved adaptive supersampling technique according to a further aspect of the invention.

FIG. 10 shows a plot 250 illustrating an interleaved adaptive supersampling technique, according to a further aspect of the invention which is tiled over the whole screen. The plotted points are represented by:

$$(\Phi_2(i), \Phi_3(i)) = P(i)$$

The image is scaled by (1, 1.5), and a 2×3 stratification is used. As shown in FIG. 10, the strata are addressed by an offset, generating a point sequence in a subpixel. The points are enumerated by the offset $O$ of the desired stratum plus the number of strata multiplied by the point number. In the illustrated section of the plot, the point numbers are:

$$i = 6j + 3$$

$$i \in \{0, 1295\}$$

In the equation i=6j+3, j is multiplied by 6 because of the 2×3 stratification. Also, $i \in \{0, 1295\} = 2^4 \cdot 3^4$.

Using the illustrated interleaving technique, adjacent pixels are sampled differently, but strictly deterministically.

III. Additional Examples and Points Regarding Quasi-Monte Carlo Integration

Computer graphics textbooks teach that sampling images using deterministic patterns or lattices can result in aliasing. Aliasing can only be avoided by random, i.e., independent sampling of images. Thus, textbooks typically recommend random samples with blue noise characteristic. However, these types of samples are highly correlated due to their maximized minimum mutual distance. Contrary to the textbook approach, the systems and techniques described herein are based on parametric integration by quasi-Monte Carlo methods, and are strictly deterministic.

Image synthesis is the most visible part of computer graphics. One aspect of image synthesis is concerned with the synthesis of physically correct images. Thus, one image synthesis technique includes identifying light paths that connect light sources and cameras and summing up their respective contributions. Another aspect of image synthesis is concerned with non-photorealistic rendering including, for example, the simulation of pen strokes or watercolor.

Image synthesis poses an integro-approximation problem for which analytical solutions are available in exceptional cases only. Therefore numerical techniques have to be applied. Prior art approaches typically use elements of classical Monte Carlo integration, in which random points are used to numerically approximate the solution to an image integral. However, as described herein, it is significantly more efficient to use quasi-Monte Carlo integration, in which sequences of quasirandom numbers are used to compute the solution to an image integral. The presently described systems and techniques are useful, for example, in a motion picture, which typically requires an extremely large number of high-quality images.

The underlying mathematical task is to determine the intensity I (k, l, t, λ), where (k, l) is the location of a pixel on the display medium. For the sake of clarity, there is omitted the dependency on the time t and the wavelength λ of a color component of a pixel in the sequel.

Determining the intensity of a single pixel I (k, l), i.e., measuring the light flux through a pixel, requires to compute a functional of the solution of the radiance transport integral equation $$L(x, \omega) = L_e(x, \omega) + \underbrace{\int_{S^2} L(h(x, \omega_i), -\omega_i) f(\omega_i, x, \omega) |\cos\theta_i| d\omega_i}_{=:(T_f L)(x,\omega)}.$$

As a Fredholm integral equation of the second kind, the radiance L in the point x into the direction ω is the sum of the source radiance $L_e$ and the reflected and transmitted radiance $T_f L$, which is an integral over the unit sphere $S^2$. The cosine of the angle $\theta_i$ between the surface normal in x and the direction of incident $\omega_i$ accounts for the perpendicular incident radiance only, which is colored by the surface interface properties given by $f$. Finally h determines the closest point of intersection of a ray from x into th direction $\omega_i$. The extension to participating media, which we omit here for lack of space, expose the same structure.

Simultaneously computing all pixels $$I(k, l) := \int_{\partial V} \int_{S^2} R_\alpha(L(x,\omega), k, l, x, \omega) d\omega dx$$

of an image is an integro-approximation problem. The mapping $R_\alpha$ represents the mathematical description of the camera and its response to the radiance L. $R_\alpha$ often is non-linear in order to be able to compensate for the limited dynamic range of most display media.

In a physically correct setting the norm $\|T_f\|$ must be bounded by 1 in order to guarantee energy conservation. Then the Neumann-series converges and the computation of the radiance $$L = SL_e := \sum_{i=0}^{\infty} T_f^i L_e$$

can be reduced to an infinite sum of integrals with increasing dimension. The single integrals $T_j^j L_e$ have a repetitive low dimensional structure inherited from stacking transport operators. Obviously lower powers of the transport operator are likely to be more important. Real world light sources $L_e$ are bounded and consequently the radiance L uniformly can be bounded by some b>0. In addition real world radiance $$L(y,\omega,t,\lambda) \in L_b^2$$

is a signal of finite energy and thus must be square integrable.

However, often singular surface properties, as for example specular reflection, are modeled by $$(T_{\delta_\omega}, L)(x,\omega) := L(h(x,\omega'),-\omega')$$

using Dirac's δ distribution, where $\omega' \equiv \omega'(\omega)$ is the direction of specular reflection. Then the operator norm of the solution operator can even reach 1 and the Neumann series can diverge. The additional problem of insufficient techniques is caused by $$\delta\mathcal{L}_b^2$$

because some transport paths cannot be efficiently sampled and force the need of biased approximations like, e.g. the photon mapping algorithm for rendering caustics.

Both the radiance L and the intensity I are non-negative and piecewise continuous, where the discontinuities cannot be efficiently predicted. The actual basis of the function class to represent and approximate the intensity I (k, l, t, λ) in fact is determined by the display medium or image storage format, e.g., an interleaved box basis for the color components of TFT displays, cosines for JPEG compressed images, etc.

Due to the lack of efficient analytical solutions, rendering algorithms reduce image synthesis to numerical integro-approximation. Simulating a camera with anti-aliasing, motion blur, and depth of field already contributes 5 dimensions to the integration domain of the intensity I. Area light sources and each level of reflection contribute another 2 dimensions. Consequently the mathematical problem is high-dimensional, discontinuous, and in $L_b^2$. Since tensor product techniques will fail due to dimensionality and a lack of continuity, Monte Carlo and quasi-Monte Carlo methods are the obvious choice.

Monte Carlo methods use random sampling for estimating integrals by means. Quasi-Monte Carlo methods look like Monte Carlo methods, however, they use deterministic points for sampling an integrand. In contrast to random samples, the specifically designed deterministic point sets are highly correlated, which allows for a much higher uniformity and results in a faster convergence.

Real random numbers on the unit interval are characterized by independence, unpredictability, and uniformity. For Monte Carlo integration the independence is required to prove error bounds and the uniformity is required to prove the order of convergence. Since real random numbers are expensive to generate, usually efficient deterministic algorithms are used to simulate pseudorandom numbers, which then of course are perfectly predictable but seemingly independent. However, the independence cannot be observed any longer after averaging the samples.

Quasi-Monte Carlo integration is based on these observations. By neglecting independence and unpredictability it is possible to construct deterministic points, which are much more uniform than random number samples can be. There exists a lot of constructions for such deterministic point sets $P_n = \{x_0, \ldots, x_{n-1}\} \subset [0,1)^s$, which are based on (1) radical inversion based point sets and (2) rank-1 lattice points:

(1) Radical inversion based point sets determine samples by where $$x_i = \left(\frac{i}{n}, \Phi_{b_1}(i), \ldots, \Phi_{b_{s-1}}(i)\right)$$

-continued $$\Phi_b: \mathbb{N}_0 \to \mathbb{Q} \cap [0, 1) \qquad (3.1)$$

$$i = \sum_{l=0}^{\infty} a_l(i) b^l \mapsto \sum_{l=0}^{\infty} a_l(i) b^{-l-1}$$

is the radical inverse in an integer base b. The digit $a_j(i)$ is the j-th digit of the index i represented in base b. The Hammersley point set is obtained by choosing $b_c$ as the c-th prime number. The uniformity of these points, has been improved by applying permutations to the $a_j(i)$ before computing the inverse. The permutation $$\pi_b(a_j(i)) = a_j(i) + j \bmod b$$

has been used, and other permutations have been developed, generalizing and improving on these results. Choosing all $b_c = b$ along with an appropriate set of mappings applied to the digits $a_j(i)$ yields the construction and theory of (t, m, s)-nets. There has been a lot of research as to how to efficiently compute radical inverses. One method is to tabulate the sum of the least significant T digits and to reuse them while generating the points $$\sum_{j=0}^{\infty} \pi_b(a_j(i)) b^{-j-1} = \underbrace{\sum_{j=T}^{\infty} \pi_b(a_j(i)) b^{-j-1}}_{\text{only every } b^T\text{-th time}} + \underbrace{\sum_{j=0}^{T-1} \pi_b(a_j(i)) b^{-j-1}}_{\text{Table of size } b^T}$$

This method has been developed in the context of scrambled radical inversion. Rather than using Gray-codes, this method generates the points in their natural order at comparable speed.

(2) Rank-1 lattice points $$x_i = \frac{1}{n}(1, g_1, \ldots g_{s-1}) \bmod 1$$

are faster to generate than radical inversion based points. Their quality depends on the integer generator vector $$(1, g_1, \ldots g_{s-1}) \in \mathbb{N}^s$$

However, the construction of good generator vectors is not obvious. In order to reduce the search space, the generator vectors have been determined by only one parameter $\alpha$ with $g_i = \alpha^i$. Higher rank lattices have be constructed by linear combinations of rank-1 lattices.

Both principles can be generalized to yield sequences of points, which allow for adaptive sampling without discarding previously taken samples, however, at the price of a slight loss of uniformity: the Halton sequence and its variations corresponding to the Hammersley points, (t, s)-sequences containing (t, m, s)-nets, and extensible lattice rules containing lattices.

The above constructions yield rational numbers in the unit interval. It is especially interesting to use the base b=2 and $n=2^m$ points, because then the points can be represented exactly in the actual machine numbers $M \subset \mathbb{Q}$ as defined by the ANSI/IEEE 754-1985 standard for binary floating point arithmetic.

The different constructions of the previous section in fact have one common feature. They induce uniform partitions of the unit cube. This kind of uniformity has been characterized as follows:

Definition 1. Let (X, β, μ) be an arbitrary probability space and let $\mathcal{M}$ be a nonempty subset of β. A point set $P_n$ of n elements of X is called (M, μ)-uniform if $$\sum_{i=0}^{n-1} \chi_M(x_i) = \mu(M) \cdot n \text{ for all } M \in \mathcal{M}.$$

where $XM(x_i)=1$ if $x_i \in M$, zero otherwise.

Examples of (M, μ)-uniform point sets are samples from the Cartesian product midpoint rule and radical inversion based points. In addition, rank-1 lattices are also (M, μ)-uniform. The Voronoi-diagram of a lattice partitions the unit cube into n sets of identical shape and volume 1/n. This underlines that for (M, μ)-uniformity all μ(M) must have the same denominator n.

The function classes of computer graphics imply to use the probability space $$([0,1)^b, \beta, \lambda_s)$$

with the Borel-sets β and the s-dimensional Lebesgue-measure $\lambda_s$.

A sequence of point sets is uniform distributed if and only if its discrepancy vanishes in the limit. The deterministic constructions sketched in previous section can obtain so-called low discrepancy, which vanishes with roughly speaking 1/n, while independent random points only can obtain roughly $1/\sqrt{n}$ and points from the Cartesian product midpoint rule even only acquire $1/\sqrt{n}$.

There are some facts about discrepancy that make it problematic. Discrepancy is an anisotropic measure, because its concept is based on axis-aligned boxes. Consequently, discrepancy is influenced by rotating point sets. While samples from the Cartesian product midpoint rule result in bad discrepancy, lattice points from the Fibonacci lattices have low discrepancy, although some of them are just rotated rectangular grids. Discrepancy is not even shift-invariant since shifting a point set on the unit torus also changes discrepancy.

Definition 1, above, supports partitions which are not axis-aligned, as for example the Voronoi-diagram of a rank-1 lattice. Maximum uniformity in this sense can be obtained by selecting the points such that the regions of the Voronoi-diagram approximate spheres as much as possible, i.e., by maximizing the mutual minimum distance $$d_{min}(P_n) := \min_{0 \le i < n} \min_{0 < j < n} \|x_j - x_i\|_x$$

among all sample points in $P_n$. $\|\cdot\|_T$ is used to denote the Euclidean distance on the unit torus. The minimum distance measure is isotropic and shift-invariant thus overcoming these disadvantages of discrepancy.

FIGS. 11A-H show a series of plots 260-330 illustrating classical quasi-Monte Carlo points for n=16 (top row) and n=64 (bottom row) along with their mutual minimum distance $d_{min}$. The rank-1 lattice has been selected such that its minimum distance is maximal. It is interesting to observe that the constructions with better discrepancy have larger minimum distance, too, as can be seen for the Hammersley points, the Sobol sequence, and the Larcher-Pillichshammer points. It also can be observed that the minimum distance of the Halton sequence, with permutations, is maximized as compared to the original Halton sequence.

Figures 11A, 11B, 11C, 11D:
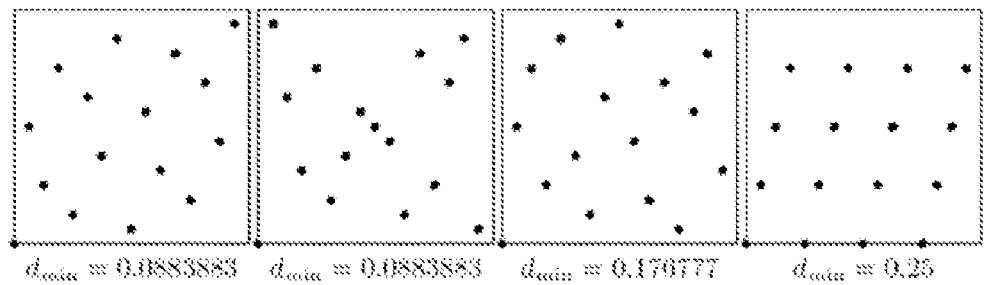
FIGS. 11A-H show a series of plots illustrating classical quasi-Monte Carlo points, along with their mutual minimum distance.
Figures 11E, 11F, 11G, 11H:
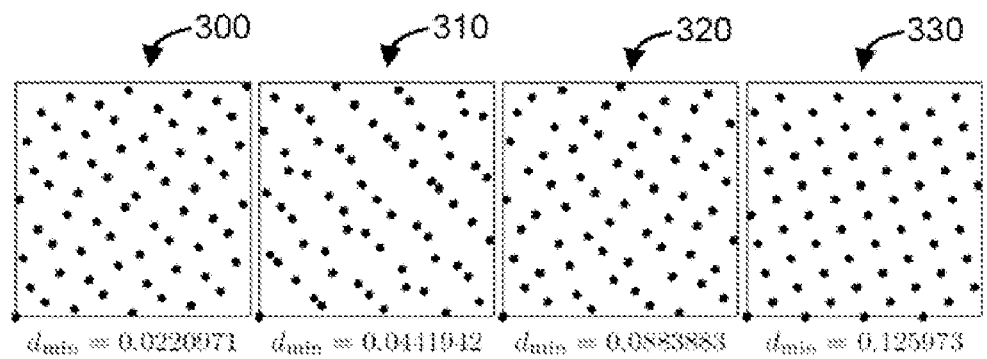

The rank-1 lattices in FIGS. 11D and 11H are Korobov lattices, where the parameter α has been chosen to maximize the minimum distance. The rank-1 lattice at n=16 points in FIG. 11D in fact can be generated as a (t, 4, 2)-net in base b=2. This is not possible for the quality parameter t=0, because at least two points lie on one line parallel to the x-axis. In this case the best quality parameter prevents the points from reaching maximum minimum distance.

Similarly, postulating $\gcd(g_i,n)=1$ restricts the search space for generator vectors of lattices in such a way that the lattices with maximum minimum distance cannot be found. Forcing Latin hypercube properties by t=0 or $\gcd(g_i,n)=1$, respectively, may be useful in some situations, however, prevents the sample points to optimally cover the unit torus in the minimum distance sense.

Maximizing the minimum distance for generating highly uniform point sets is a principle of nature. For example the distribution of the receptors in the retina is grown that way. Algorithmically, this principle is known as "Lloyd's relaxation scheme," according to which samples with identical charges are placed on the unit torus and then the points are allowed to repel each other until they reach some equilibrium. From a mathematical point of view, the points are moved to the center of gravity of their Voronoi cells during relaxation. The convergence of this scheme has been improved quadratically. Note that rank-1 lattices are invariant under this kind of relaxation scheme.

Figures 12A, 12B, 12C:
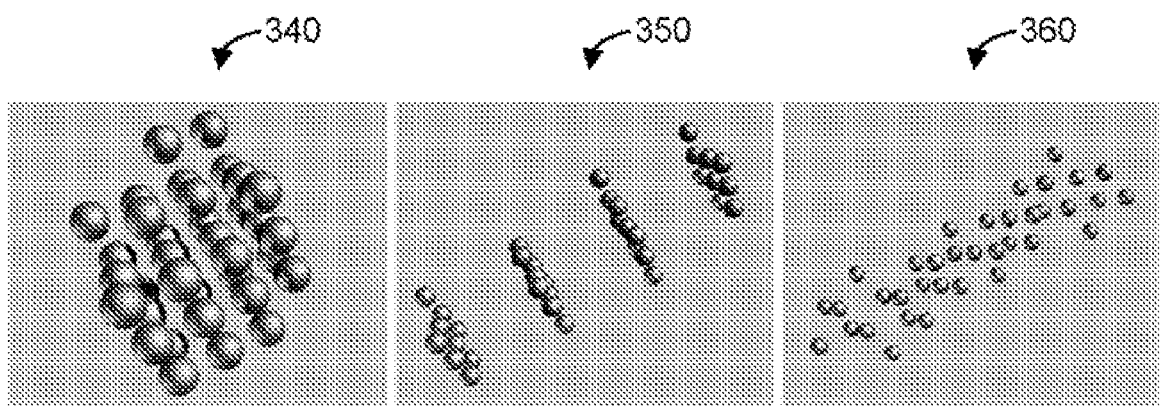
FIGS. 12A-C shows a series of drawings illustrating selection of lattices by maximum minimum distance.

Points are selected by maximizing the mutual Euclidean distance on the unit torus induced by $\|\cdot\|_T$ have the advantage that they seamlessly can be tiled in order to fill s-dimensional space. This property is intrinsic to lattices. However, it is not true for radical inversion based points in general. While the points by Larcher and Pillichshammer tile seamlessly, the Hammersley points do not. The normal $\|\cdot\|_T$ in fact should be a weighted norm, which includes the size of the integration domain. FIGS. 12A-C shows a series of drawings 340-360, illustrating selection of lattices by maximum minimum distance in the unit cube (FIG. 12A); in the unit cube scaled to the integration domain (FIG. 12B); and (in the integration domain (FIG. 12C). Considering the scale of the integration domain yields more uniform points. In particular, it will be see that maximizing the minimum distance on the unit cube does not imply nice uniformity when scaling the domain of integration.

It is common knowledge that quasi-Monte Carlo integration outperforms Monte Carlo integration in many applications. However, the classical error bound theorems often do not fit the function classes of the application.

The Koksma-Hlawka inequality deterministically bounds the integration error by the product of the discrepancy of the sample points used to determine the sample mean and the variation of the integrand in the sense of Hardy and Krause. The variation can be considered as the remainder of trying to obtain discrepancy as a factor in the error bound.

The class of functions of bounded variation is impractical in certain situations. For example, discontinuities that are not aligned with the coordinate axes already yield infinite variation. The error bound thus becomes useless in already simple settings of computer graphics such as an edge $$f(x, y) = \begin{cases} 1 & y > x \\ 0 & \text{else} \end{cases} \quad (3.2)$$

in the unit square, for which the variation is unbounded. Using other kinds, such as for example isotropic discrepancy, is possible to find an error bound that works for this case. However, it becomes far too pessimistic in higher dimensions.

Similar to the Koskma-Hlawka inequality there exist deterministic error bounds for the integration by lattices. The used function class requires periodic functions and imposes certain constraints on the Fourier coefficients of the integrand, which do not apply for discontinuous functions as used in computer graphics.

In a vast number of publications experiments give numerical evidence that quasi-Monte Carlo methods outperform Monte Carlo methods in practice, however, in the majority of the cases classical theorems cannot explain the observed results. The main reason is that general discontinuities cannot be accounted for by the classical error bounds.

As stated above image synthesis is an integro-approximation problem in $L_b^2$ and quasi-Monte Carlo integro-approximation in fact successfully has been used in computer graphics. Therefore, the following theorem may be generalized in the sense of parametric integration:

Theorem 1. Let $(X, \beta, \mu)$ be an arbitrary probability space and let $M=\{M_l, \ldots M_k\}$ be a partition of X with $M_j \in B$ for $1 \leq j \leq k$. Then for any $(M, \mu)$-uniform point set $P=\{x_1, \ldots x_n\}$ and any bounded function $f$, which restricted to X is $\mu$-integrable, we have $$\left\| \frac{1}{n} \sum_{i=0}^{n-1} f(x, y) - \int_X f(x, y) d\mu(x) \right\| \leq$$

$$\sum_{j=1}^{k} \mu(M_j) \left\| \sup_{x \in M_j} f(x, y) - \inf_{x \in M_j} f(x, y) \right\|$$

for any suitable norm $\|\cdot\|$.

This theorem may be proved as follows: For all $y \in Y$, consider an arbitrary stratum $M_j \in M$. Then, $$\sum_{i=0}^{n-1} \chi_M(x_i) \inf_{x \in M_j} f(x, y) \leq \sum_{\substack{i=0 \\ x_i \in M_j}}^{n-1} f(x_i, y) \leq \sum_{i=0}^{n-1} \chi_{M_j}(x_i) \sup_{x \in M_j} f(x, y)$$

which implies $$\mu(M_j) \inf_{x \in M_j} f(x, y) \leq \frac{1}{n} \sum_{\substack{i=0 \\ x_i \in M_j}}^{n-1} f(x_i, y) \leq \mu(M_j) \sup_{x \in M_j} f(x, y)$$

because P is an $(M, \mu)$-uniform point set. Similarly, $$\mu(M_j) \inf_{x \in M_j} f(x, y) \le \int_{M_j} f(x, y) dp(x) \le \mu(M_j) \sup_{x \in M_j} f(x, y)$$

From the latter two sets of inequalities it follows that $$\left| \frac{1}{n} \sum_{\substack{i=0 \\ x_i \in M_j}}^{n-1} f(x_i, y) - \int_{M_j} f(x, y) d\mu(x) \right| \le \mu(M_j) \left( \sup_{x \in M_j} f(x, y) - \inf_{x \in M_j} f(x, y) \right)$$

Since M is a partition of X, $$\sum_{i=0}^{n-1} f(x_i, y) - \int_X f(x, y) d\mu(x) = \frac{1}{n} \sum_{j=1}^{k} \sum_{\substack{i=0 \\ x_i \in M_j}}^{n-1} f(x_i, y) - \sum_{j=1}^{k} \int_{M_j} f(x, y) d\mu(x)$$

$$= \sum_{j=1}^{k} \left( \frac{1}{n} \sum_{\substack{i=0 \\ x_i \in M_j}}^{n-1} f(x_i, y) - \sum_{j=1}^{k} \int_{M_j} f(x, y) d\mu(x) \right)$$

Using the previous inequality and applying the norm $\|\cdot\|$ to both sides of the resulting inequality yields the desired bound.

By the omission of y, the norm reduces to the absolute value and it remains the original theorem and proof of the following Theorem 2:

Theorem 2. Let $(X, \beta, \mu)$ be an arbitrary probability space and let $M = \{M_1, \ldots, M_k\}$ be a partition of X with $M_j \in \beta$ for $1 \le j \le k$. Then for any $(M, \mu)$-uniform point set $P = \{x_0, \ldots, x_{n-1}\}$ and any bounded $\mu$-integrable function $f$ on X we have $$\left| \int_X f(x) d\mu(x) - \frac{1}{n} \sum_{i=0}^{n-1} f(x_i) \right| \le \sum_{j=1}^{k} \mu(M_j) \left( \sup_{x \in M_j} f(x) - \inf_{x \in M_j} f(x) \right)$$

By using the concept of $(M, \mu)$-uniform point sets instead of discrepancy, proofs become simpler and results are more general, compared with earlier approaches. With $(X, \beta, \mu) = ([0,1)^s, \beta, \lambda_b)$, both theorems are applicable in the setting of computer graphics.

For the example, the deterministic error $O(n^{-1/2})$ bound can be obtained by selecting an $(M, \mu)$-uniform point set with $k=n$. The difference of the supremum and the infimum can only be one in the $O(n^{-1/2})$ sets of the partition, which are crossed by the discontinuity, otherwise it must be zero. With $\mu(M_j) = 1/n$, the bound is obtained. It will be seen that this argument does not use probabilistic arguments for a deterministic algorithm.

Quasi-Monte Carlo methods are biased, because they are deterministic, but consistent, because they asymptotically converge to the right solution. Randomizing these algorithms allows for unbiased estimators and for unbiased error estimators.

It is useful to consider the method of dependent tests $$\int_{[0,1)^s} f(x, y) dx = \int_{[0,1)^s} \sum_{i=0}^{n-1} w_i(x, y) f(R_i(x), y) dx \quad (3.3)$$

$$\approx \sum_{i=0}^{n-1} w_i(\omega, y) f(R_i(\omega), y)$$

by first applying an equivalence transformation, which does not change the result, and then using one random sample $\omega$ in order to obtain an unbiased estimate.

This formulation is able to cover a wide range of techniques that increase the efficiency of the method of dependent tests. For example, random scrambling of arbitrary points, random translation on the unit torus, random padding of arbitrary point sets, stratification and stratification induced by rank-1 lattices, trajectory splitting, and many more techniques easily can be formulated by a tuple of replications $R_i$ with associated weights $w_i$.

Omitting y, the special case with equal weights $$w_i(x) = \frac{1}{n}$$

where for fixed $\omega$ the set of points $$(R_i(\omega))_{i=0}^{n-1}$$

$(R_i(\omega))_{n-1}$ is of low discrepancy, is defined to be randomized quasi-Monte Carlo integration.

Repeating independent realizations allows one to estimate the error of the approximation in an unbiased way. However, some convergence is sacrificed, since independent random samples cannot be as uniformly distributed as correlated samples can be. This is especially noticeable in the setting of computer graphics, where small numbers of samples are used.

Anti-aliasing is a central problem in computer graphics. FIG. 13 is a computer-generated image 370 of an infinite plane with a checkerboard texture that illustrates various difficulties. While in the front of the checkerboard, the fields clearly can be distinguished, extraneous patterns appear towards the horizon. While it is simple to compute the color of a pixel as an average as long as the checker board cells are clearly distinguishable, this is no longer possible at the horizon, where through one pixel infinitely many cells can be seen. By common sense, it would be expected that the pixels at the horizon would be gray, i.e., the average of black and white. However, surprisingly, zooming into a pixel reveals that the areas of black and white tiles are not equal in general. This means that no matter what quadrature is used, the horizon will not appear gray, but somehow patterned.

The lens of the human eye is not perfectly transparent and thus slightly blurs the light before it reaches the retina. The amount of blur perfectly fits the resolution of the receptors in the retina. A similar trick in computer graphics is to blur the texture before integration, where the strength of the blur depends on the distance from the eye. However, this blurring technique does not help, if the mathematical problems are not caused by textures. Another compromise is to filter the resulting image. However, a filtering technique causes not only aliases but also previously sharp details to become blurred.

Aliasing can only be hidden by random sampling. Taking one independent random sample inside each pixel, the horizon will appear as uncorrelated black and white pixels. The structured aliases thus are mapped to noise, which is less disturbing to the eye. However, taking more random samples per pixel, the quadrature will eventually converge and aliases will appear instead of the noise.

Assuming that situations like the ones mentioned before can be managed by suitable filtering, there are now discussed alternative sampling patterns of computer graphics. These sampling patterns are illustrated in FIGS. 14A-C. FIG. 14A shows stratified sampling 380; FIG. 14B shows Latin hypercube sampling 390; and FIG. 14C shows blue noise sampling 400. FIGS. 15A-E show a series of drawings 410-450, illustrating sampling using quasi-Monte Carlo points.

Stratified sampling, shown in (a), is at least as good as random sampling. However, stratified sampling suffers from the curse of dimension, since each axis of the integration domain has to be divided at least once.

Latin hypercube sampling, shown in (b), can never be much worse than random sampling and is available for any dimension and number of samples. The average observed performance is good, although it cannot be guaranteed.

Poisson disk sampling, shown in (c), simulates the distribution of receptors in the human eye. The mutual minimum distance of the points is maximized, which results in a reduced noise level in the rendered image. Although restricted by a guaranteed minimum distance, i.e., an empty disk around each sample, the samples points are randomly placed. Thus representable details remain sharp in the final image and aliases are efficiently mapped to noise. However, Poisson disk sampling patterns are typically expensive to generate.

The properties of the sampling patterns seem disjointed, however, there exist quasi-Monte Carlo points, which can be generated efficiently, and which unite the above properties.

There is now discussed an anti-aliasing technique, using (0, 2m, 2)-nets in base b=2.

The use of Hammersley points in the accumulation buffer algorithm has been investigated. Despite considerable improvements, each pixel had to use the same samples, which required higher sampling rates in order to avoid aliases. One solution to that problem is to exploit the structure of (0, 2m, 2)-nets in base b=2.

FIGS. 15A-E illustrate that (0, 2m, 2)-nets in base b=2 unite the properties of classical sampling patterns in computer graphics. The first two dimensions $$x_i = \left( \frac{i}{(2^m)^2}, \Phi_2(i) \right)$$

of the Hammersley points are an example of such a point set, which is stratified, a Latin hypercube sample, and has a guaranteed minimum distance of at least $$\frac{1}{(2^m)^2}.$$

Figure 16:
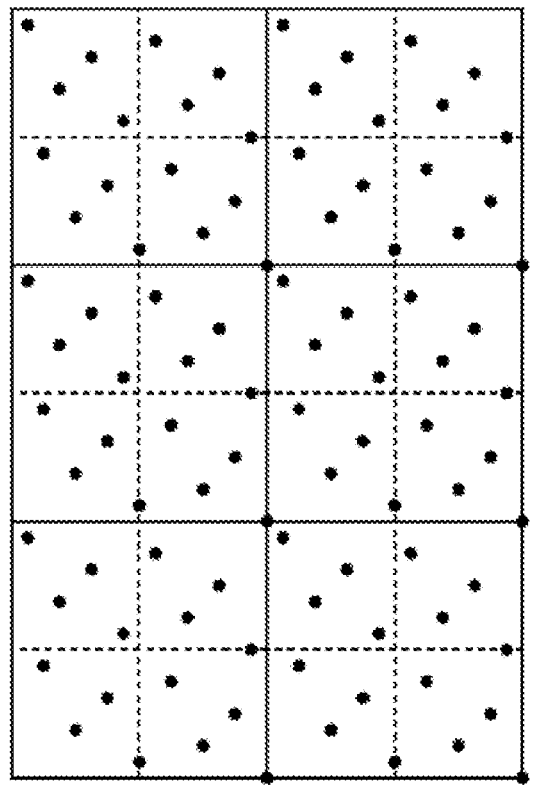
FIG. 16 shows an illustration of how samples in a pixel are determined by tiled instances of a Hammersley point set.

The method of dependents tests is realized by tiling the image plane with copies of the (0, 2m, 2)-net. FIG. 16 shows a plot 460, illustrating how the samples in a pixel are determined by tiled instances of a Hammersley point set. The solid lines indicate the unit square including one set of 16 Hammersley points and the dashed lines indicate screen pixel boundaries. Because of a lack of space, the illustration uses only 4 samples per pixel.

In order to reduce aliasing artifacts, neighboring pixels should have different samples. This is achieved by letting one Hammersley point set cover multiple pixels. The improvement in convergence is visible in the same figure, where we compare stratified random sampling and anti-aliasing by using the Hammersley point set. The improvements directly transfer to other rendering algorithms, such as for example the REYES architecture as used in PIXAR's RenderMan software.

Selecting rank-1 lattices by maximum minimum distance takes the principle of Lloyd relaxation and Poisson disk sampling to the limit. Since rank-1 lattices are available for any number n of points, the sampling rate can be chosen freely. A factorization of n as required for axis-aligned stratified sampling is not needed. In order to attenuate aliasing in each pixel a different random shift is added to the lattice points resulting in an unbiased estimate. The images obtained that way display minimal noise and aliasing. The samples of a randomly shifted lattice can be generated fast and the observed convergence is even faster as compared to the radical inversion based methods from the previous section. The method can be derandomized by extracting the shift from, e.g., Hammersley point set using the stratification properties pointed out in the previous section.

The principles of the previous sections can be extended to approximate the full integro-approximation problem. Using the Neumann series the computation of L is reduced to a sum of integrals as sketched in the introduction. Extensive investigations have been carried out on path tracing algorithms in connection with quasi-Monte Carlo methods and randomized versions of the latter methods. All the experiments resulted in improvements when using quasi-Monte Carlo methods as compared to classical algorithms of computer graphics.

As mentioned above, randomizing quasi-Monte Carlo methods allows for unbiased estimators and unbiased error estimates. The latter does not appear to be particularly interesting in computer graphics, as better adaptive methods already exist, as discussed below. Furthermore, the resulting images can be generated in the same time and quality no matter whether a quasi-Monte Carlo or its randomized counterpart is used.

However, it interesting to look at the effect of randomization schemes on the minimum distance. While randomizing point sets by random shifts does not change their maximum minimum distance on the torus, random scrambling does.

Applying random scrambling to the classical low discrepancy points sets it can be observed that often the uniformity is improved and rarely decreased. This is true for both discrepancy and minimum distance. Experiments indicate that random scrambling only marginally changes the uniformity of the scrambled Halton sequence, indicating that deterministic permutations already are a very good choice.

Permutations for the Halton sequence are realizations of random scrambling and can be considered as deterministic scrambling long before random scrambling was introduced. Although the permutations have been introduced to improve on discrepancy, they also increase the maximum minimum distance of the Halton points. Implementing the scrambled Halton sequence is much simpler than random scrambling and avoids the risk that uniformity if influenced negatively.

In computer graphics, the difficulty of the integro-approximation problem differs from pixel to pixel and adaptive methods pay off. A possible criterion for refinement is to compare the image gradient $$\|\nabla I(k,l)\|_2 > T \cdot n_{k,l}^{-\alpha} \qquad (3.4)$$

against a threshold T. By the exponent $\alpha \in [0.5, 1.5]$ we can adapt to the speed of convergence and $n_{k,l}$ is the number of samples used for pixel (k,l). Alternatively refinement can be indicated by the routines that evaluate the radiance L, since these routines can access more information of the scene to be rendered.

In the following discussion, there is described a technique for adaptive anti-aliasing by elements of the Halton sequence. The method is superior to random sampling, since the points of the Halton sequence are more uniform and spoken visually exactly fall into the largest unsampled gaps of the sampling domain resulting in a smooth convergence.

The radical inverse in Equation (3.1) mirrors the representation of the index i by the digits $\alpha_t(i) \in \{0, \ldots, b-1\}$ in the integer base $b \in \mathbb{N}$ at the decimal point. In base b=2 this means that $$\Phi_2(i) \in \begin{cases} [0, 1/2) & \text{for } i \text{ even,} \\ [1, 1/2) & \text{else.} \end{cases} \qquad (3.5)$$

This observation has been generalized and named periodicity. In fact, however, this property relates much more to stratification as formalized by the definition of (0, 1)-sequences. Therefore, a different derivation is presented that stresses the actual stratification property. The index i is chosen as $$i = j \cdot b^n + k \text{ for } k \in \{0, \ldots, b^n - 1\}$$

and inserted into (1), yielding $$\Phi_b(i) = \Phi_b(j \cdot b^n + k) \qquad (3.6)$$

$$= \sum_{l=0}^{\infty} a_l(j \cdot b^n + k) b^{-l-1}$$

$$= \sum_{l=0}^{\infty} a_l(j \cdot b^n) b^{-l-1} + \sum_{l=0}^{\infty} a_l(k) b^{-l-1}$$

$$= \sum_{l=0}^{\infty} a_l(j) b^{-n-l-1} + \Phi_b(k)$$

$$= \underbrace{b^{-n} \Phi_b(j)}_{\in [0, b^{-n})} + \Phi_b(k)$$

by exploiting the additivity of the radical inverses that belong to the class of (0,1)-sequences. The first term of the result depends on j and obviously is bounded by $b^n$, while the second term is a constant offset by the radical inverse of k. Since $$k \in \{0, \ldots, b^n - 1\}$$

it follows that $$\Phi_k \in \{0, b^{-n}, 2b^{-n}, \ldots, (b^n - 1)b^{-n}\}$$

Fixing the n first digits by k then for $j \in \mathbb{N}_0$ yields radical inverses only in the interval $$[\Phi_b(k), \Phi_b(k) + b^{-n})$$

The one-dimensional observations from the previous section generalize to higher dimensions. For the Halton sequence $$x_i = (\Phi_{b_3}(i), \ldots, \Phi_{b_s}(i)) \in [0,1)^S$$

where for the c-th component $b_c$ is the c-th prime number, this is seen by choosing the index $$i = j \cdot \prod_{d=1}^{s} b_d^{n_d} + k \text{ with } 0 \le k < \prod_{d=1}^{s} b_d^{n_d} \qquad (3.7)$$

yielding $$\Phi_{b_c}(i) = \Phi_{b_c}\left(j \cdot \prod_{d=1}^{s} b_d^{n_d} + k\right) = b_c^{-n_c} \Phi_{b_c}\left(j \cdot \prod_{\substack{d=1 \\ d \ne c}}^{s} b_d^{n_d}\right) + \Phi_{b_c}(k)$$

which is analogous to Equation (3.6) and consequently $$x_i \in \prod_{c=1}^{s} [\Phi_{b_c}(k), \Phi_{b_c}(k) + b_c^{-n_c})$$

for fixed k and $j \in \mathbb{N}_0$ with the choice of the index i according to Equation (3.7). The $$\prod_{d=1}^{S} b_d^{n_d}$$

disjoint strata selected by k are disjoint and form a partition of the unit cube $[0,1)^s$. However the scheme suffers from the curse of dimension, since stratifying all s-dimensions results in an exponential growth of the number of strata. The increment $$\prod_{d=1}^{S} b_d^{n_d}$$

grows even faster than 2' since except the first, all $b_d > 2$.

A tensor product approach has been compared with an approach using the Halton sequence. An illustration has been constructed of the stratification of path space for photons that are emitted on the light source and traced for 2 reflections. The problem requires samples from the 8-dimensional unit cube. The sampling domain was stratified into $128^8$ strata of identical measure. The one stratum was selected and 8 random samples have been drawn from it to determine the photon trajectories. Stratification by the Halton sequence was been used to determine the 8 paths. In spite of an enormously large increment that hardly fits into the integer representation of a computer, the trajectories start to diverge after the 2nd reflection.

For a stratification as fine as the tensor product approach large increments $$\prod_{d=1}^{S} b_d^{n_d}$$

are required that hardly fit the integer representation of a computer. In addition, the assumption that close points in the unit cube result in close paths in path space is not valid for more complex scenes. Depending on what part of the geometry is hit, the photons can be scattered in completely different parts of the scene, although their generating points had been close in the unit cube. The longer the trajectories the more diverging they will be. The above observations easily can be transferred to (t, s)-sequences in base b.

Figure 17A:
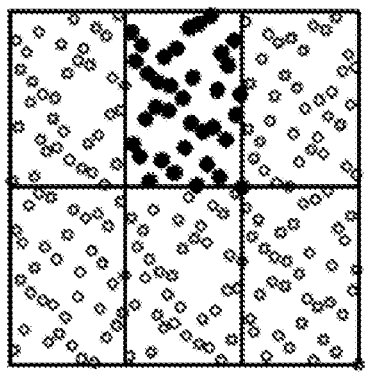
FIGS. 17A and 17B are plots illustrating how samples from the Halton sequence in the unit square are scaled to fit the pixel raster.
Figure 17B:
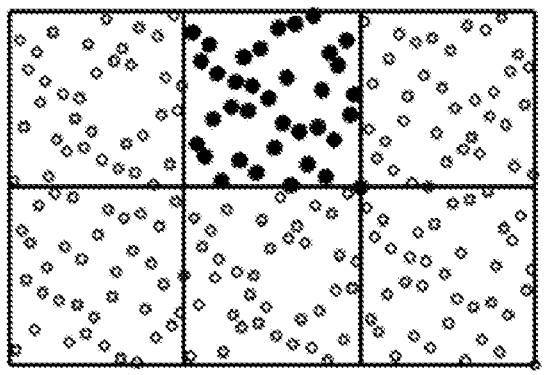

While stratification by the Halton sequence is not useful in high dimensions, it can be very useful in small dimensions as, for example, in pixel anti-aliasing. The properties in two dimensions are illustrated in FIGS. 17A and 17B, which are plots 470 and 480 illustrating how the samples from the Halton sequence in the unit square were scaled to fit the pixel raster. The plots show, respectively, the first two components $x_i = (\Phi_2(i), \Phi_3(i))$ of the Halton sequence for $0 \leq i < 2^3 \cdot 3^3 = 216$. The solid points have the indices $i \equiv i_k(j) = 2^1 \cdot 3^1 \cdot j + k$ selected by k=1. The stratum with the emphasized points contains all indices $i \equiv i_k(f)$ with k=1. In order to match the square pixels the coordinates are scaled, i.e., $$x_i \to x'_i = (2^1 \cdot \Phi_2(i), 3^1 \cdot \Phi_3(i))$$

In general the first component $x_i^{(1)}$ is scaled $b_1^{n_1}$ and the second $x_i^{(2)}$ by $b_2^{n_2}$. Thus a $b_1^{n_1} \times b_2^{n_2}$ stratified sample pattern is obtained that can be periodically tiled over the image plane, as described above. Identifying each stratum with a pixel, the identification k easily is determined (for example by a table lookup) by the pixel coordinates and a Halton sequence restricted to that pixel is obtained from $$i \equiv i_k(j) = j \cdot b_1^{n_1} \cdot b_2^{n_2} + k \text{ for } j \in \mathbb{N}_0$$

Exemplary images have been computed using a path tracer as described above, with the scrambled Halton sequence. Refinement was triggered by the gradient (4). Note that the scrambling does not change $\Phi_2$ and $\Phi_3$. Consequently, the above algorithm can be applied directly and benefits from the improved uniformity of the scrambled sequence.

Trajectory splitting can increase efficiency in rendering algorithms. A typical example is volume rendering. While tracing one ray through a pixel it is useful to send multiple rays to the light sources along that ray. It has been shown that taking equidistant samples on the ray that all have been randomly shifted by the same amount is much more efficient than the original method that used jittered sampling.

A general approach to trajectory splitting is to restrict the replications in Equation (3.3) to some dimensions of the integrand. For quasi-Monte Carlo methods, this approach has been used in implementation, according to which a strictly deterministic version of distribution ray tracing was developed. A systematic approach has been taken, according to which randomization techniques from the field of randomized quasi-Monte Carlo methods have been parameterized. Instead of using random parameters, deterministic quasi-Monte Carlo points have been applied. Seen from a practical point of view, trajectory splitting can be considered as low-pass filtering of the integrand with respect to the splitting dimensions.

The most powerful method is to split trajectories using domain stratification induced by rank-1 lattices. For the interesting s-dimensions of the problem domain, a rank-1 lattice is selected. The matrix B contains the vectors spanning the unit cell as identified by the Voronoi-diagram of the rank-1 lattice. Then $$R_i : [0, 1)^s \to A_i$$

$$x \mapsto \left(\frac{i}{n} \cdot (1, g_1, \ldots, g_{s-1}) + B_x\right) \bmod [0, 1)^s$$

maps points from the unit cube to the i-th stratum $A_i$ of the rank-1 lattice, as depicted in FIG. 18 discussed below. This scheme can be applied recursively yielding recursive Korobov filters.

Figures 18A, 18B, 18C:
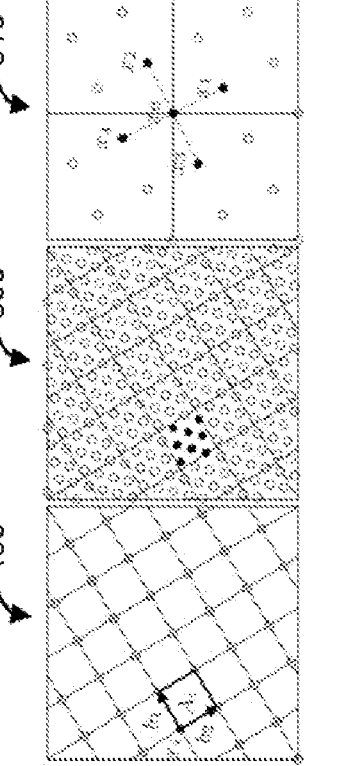
FIGS. 18A-C are a series of plots illustrating replications by rank-1 lattices.

For the special case of the Fibonacci lattice at n=5 points the recursive procedure has been used for adaptive sampling in computer graphics. Starting with the lattice $\mathbb{Z}^2$, the next refinement level is found by rotating $\mathbb{Z}^2$ by arctan (1/2) and scaling it by $1/\sqrt{5}$, as indicated in FIG. 18C, discussed below. The resulting lattice again is a rectangular lattice and the procedure recursively can be continued. Thus, the construction is completely unrelated to rank-1 lattices.

FIGS. 18A-C show a series of plots 490-510 illustrating replications by rank-1 lattices. The Voronoi-diagram of a rank-1 lattice induces a stratification, shown in FIG. 18A. All cells $A_i$ are of identical measure and in fact rank-1 lattices are $(M, \mu)$-uniform. A cell $A_i$ is anchored at the i-th lattice point $x_i$, and is spanned by the basis vectors $(b_1, b_2)$. This can be used for recursive Korobov-filters, shown in FIG. 18B, where the points inside a lattice cell are determined by another set of lattice points transformed into that lattice cell. In computer graphics one special case (c) of this principle has been named $\sqrt{5}$ sampling, shown in FIG. 18C, because the length of the dashed lines is $1/\sqrt{5}$. It is in fact a recursive Korobov filter with points from the Fibonacci lattice at n=5 points.

Good results have been obtained from a distribution ray tracer that used randomly shifted rank-1 lattices with maximized minimum distance. Trajectory splitting was realized using rank-1 lattices with maximized minimum distance, too.

One random vector was used per pixel to shift the lattice points in order to obtain an unbiased estimator and to decorrelate neighboring pixels. The resulting images exposed terminal noise and while aliasing artifacts are pushed to noise. Compared to previous sampling methods the convergence was superior, due to the high uniformity of the lattice points.

As lattice points are maximally correlated, this is a good example for correlated sampling in computer graphics. In this context, quasi-Monte Carlo integro-approximation by lattice points can be considered as Korobov filtering.

While applications of quasi-Monte Carlo integration in finance attracted a lot of attention instantly, developments in computer graphics were not that spectacular. Today, however, about half of the rendered images in movie industry are synthesized using strictly deterministic quasi-Monte Carlo integro-approximation. In 2003, these techniques were awarded a Technical Achievement Award and (Oscar) by the American Academy of Motion Picture Arts and Sciences. In contrast to academia, graphics hardware and software industry, early recognized the benefits of quasi-Monte Carlo methods.

Deterministic quasi-Monte Carlo methods have the advantage that they can be parallelized without having to consider correlation as encountered when using pseudo-random number generators. By their deterministic nature the results are exactly reproducible even in a parallel computing environment.

Compared to classical algorithms of computer graphics the algorithms are smaller and more efficient, since high uniformity is intrinsic to the sample points. A good example is trajectory splitting by rank-1 lattice that have maximized minimum distance.

In computer graphics it is known that maximizing the minimum distance of point sets increases convergence speed. However, algorithms to create such points, such as Lloyd's relaxation method, are expensive. With quasi-Monte Carlo methods selected by maximized minimum distance, efficient algorithms are available and savings up to 30% of the computation time for images of the same quality as compared to random sampling methods can be observed.

In the setting of computer graphics quasi-Monte Carlo methods benefit from the piecewise continuity of the integrands in $L_b^2$. Around the liens of discontinuity the methods are observed to perform no worse than random sampling, while in the regions of continuity the better uniformity guarantees for faster convergence. The observed convergence rate is between $O(n^{-1})$ and $O(n^{-1/2})$. It depends on the ratio of the number of sets in the partition induced by (M, µ)-uniform points and the number of these sets containing discontinuities. Since with increasing number of dimensions the integrands tend to contain more discontinuities the largest improvements are observed for smaller dimensions.

Since photorealistic image generation comprises the simulation of light transport by computing functionals of the solution of a Fredholm integral equation of the second kind, the quasi-Monte Carlo methods developed for computer graphics apply to other problems of transport theory as well.

The concept of maximized minimum distance as used in computer graphics nicely fits the concept of (M, µ)-uniformity as used in quasi-Monte Carlo theory. Rank-1 lattices selected by maximized minimum distance ideally fit both requirements and yield superior results in computer graphics.

IV. General Methods

FIGS. 19-22 are a series of flowcharts illustrating general methods according to further aspects of the present invention.

Figure 19:
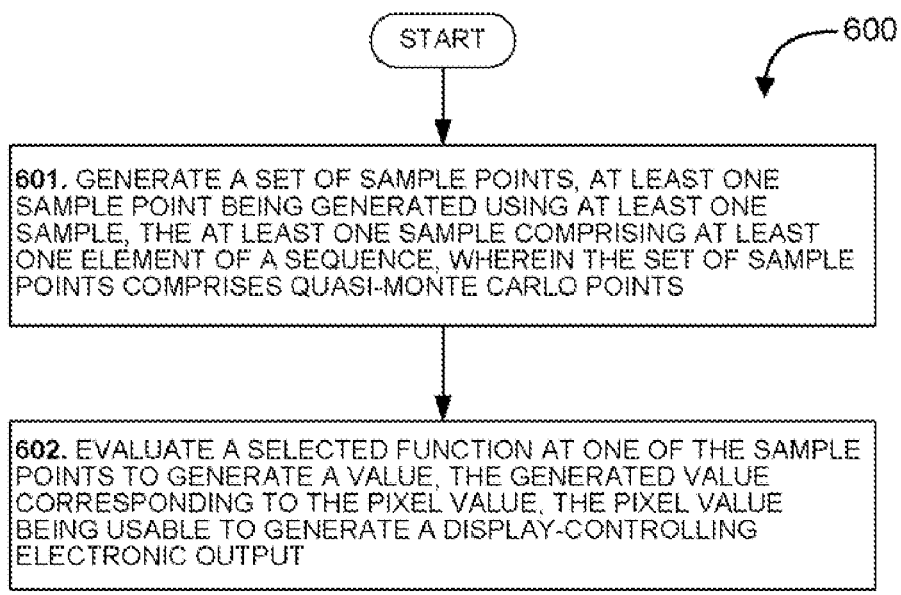
FIGS. 19-22 show a series of flowcharts of general methods according to aspects of the invention.

FIG. 19 is a flowchart of a computer-implemented method 600 for generating a pixel value for a pixel in an image displayable via a display device, the pixel value being representative of a point in a scene. The method includes the following steps:

Step 601: Generating a set of sample points, at least one sample point being generated using at least one sample, the at least one sample comprising at least one element of a sequence, and wherein the set of sample points comprises quasi-Monte Carlo points.

Step 602: Evaluating a selected function at one of the sample points to generate a value the generated value corresponding to the pixel value, the pixel value being usable to generate a display-controlling electronic output.

Figure 20:
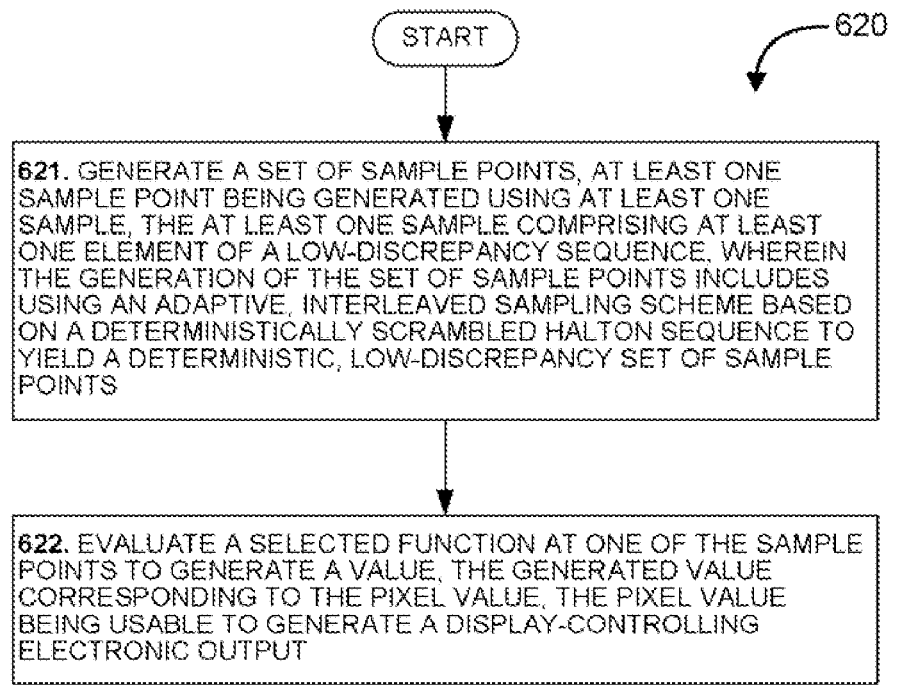

FIG. 20 shows a flowchart of a computer-implemented method 620 for generating a pixel value for a pixel in an image displayable via a display device, the pixel value being representative of a point in a scene. The method comprises the following steps:

Step 621: Generating a set of sample points, at least one sample point being generated using at least one sample, the at least one sample comprising at least one element of a low discrepancy sequence, and wherein the generating includes using an adaptive, interleaved sampling scheme based on a deterministically scrambled Halton sequence to yield a deterministic, low discrepancy set of sample points.

Step 622: Evaluating a selected function at one of the sample points to generate a value, the generated value corresponding to the pixel value, the pixel value being usable to generate a display-controlling electronic output.

Figure 21:
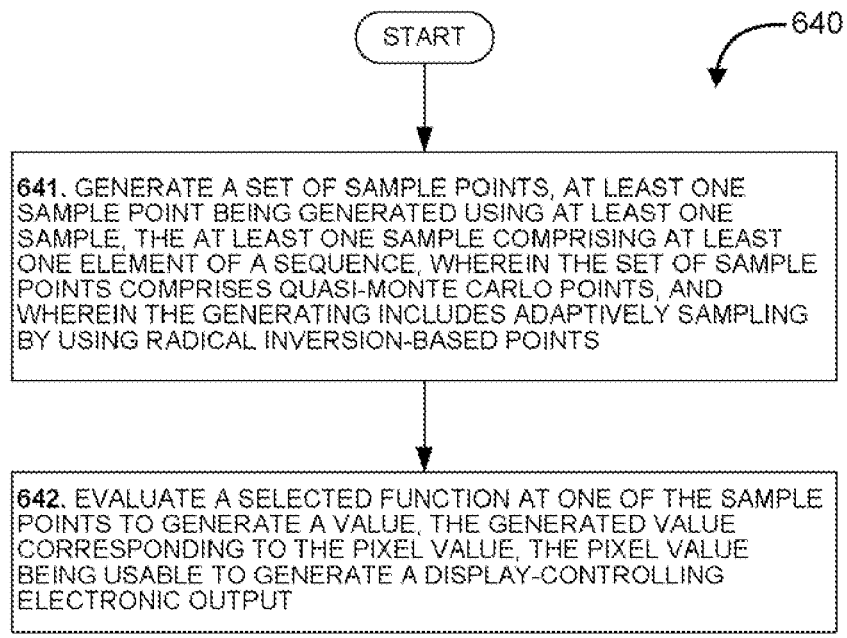

FIG. 21 shows a flowchart of a computer-implemented method 640 for generating a pixel value for a pixel in an image displayable via a display device, the pixel value being representative of a point in a scene. The method comprises the following steps:

Step 641: Generating a set of sample points, at least one sample point being generated using at least one sample, the at least one sample comprising at least one element of a sequence, wherein the set of sample points comprises quasi-Monte Carlo points, and wherein the generating includes adaptively sampling by using radical inversion-based points.

Step 642: Evaluating a selected function at one of the sample points to generate a value, the generated value corresponding to the pixel value, the pixel value being usable to generate a display-controlling electronic output.

Figure 22:
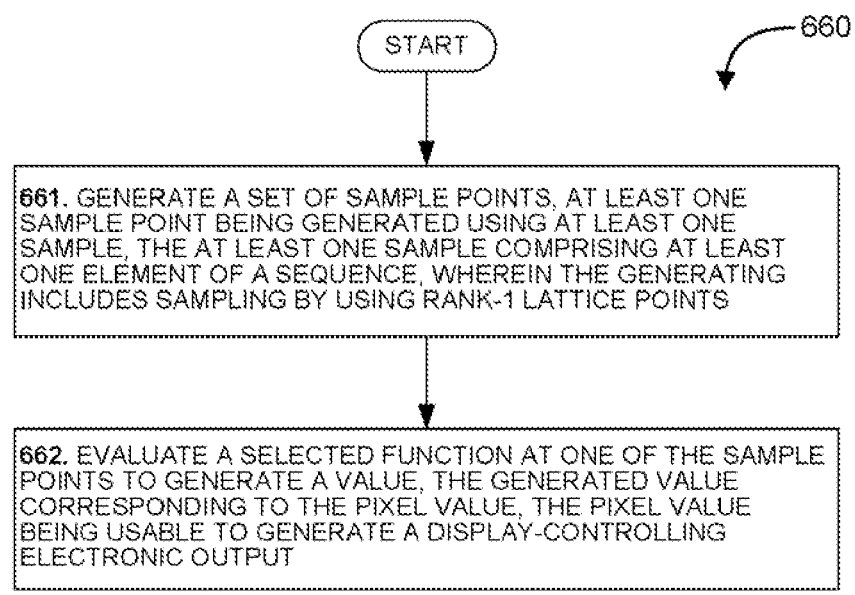

FIG. 22 shows a flowchart of a computer-implemented method for generating a pixel value for a pixel in an image displayable via a display device, the pixel value being representative of a point in a scene. The method comprises the following steps:

Step 661: Generating a set of sample points, at least one sample point being generated using at least one sample, the at least one sample comprising at least one element of a sequence, wherein the generating includes sampling by using rank-1 lattice points.

Step 662: Evaluating a selected function at one of the sample points to generate a value, the generated value corresponding to the pixel value, the pixel value being usable to generate a display-controlling electronic output.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. A computer-implemented method of generating a pixel value for a pixel in an image displayable via a display device, the pixel value being representative of a point in a scene, the method comprising:

generating a set of sample points, at least one sample point being generated using at least one sample, the at least one sample comprising at least one element of a sequence, wherein the set of sample points comprises quasi-Monte Carlo points, and wherein the generating comprises adaptively sampling by using radical inversion-based points;

evaluating a selected function at one of the sample points to generate a value, the generated value corresponding to the pixel value, the pixel value being usable to generate a display-controlling electronic output;

wherein a pixel is deemed refined whenever a refinement criterion is met, and wherein the refinement criterion can include comparing the image gradient against a predefined threshold T; and selecting a value, for an exponent for a coefficient to be multiplicatively applied to the threshold T, to enable adaptation to the speed of convergence, wherein the coefficient is the sampling rate.

2. A computer-implemented method of generating a pixel value for a pixel in an image displayable via a display device, the pixel value being representative of a point in a scene, the method comprising:

generating a set of sample points, at least one sample point being generated using at least one sample, the at least one sample comprising at least one element of a sequence, wherein the generating includes sampling by using rank-1 lattice points;

evaluating a selected function at one of the sample points to generate a value, the generated value corresponding to the pixel value, the pixel value being usable to generate a display-controlling electronic output;

applying anti-aliasing by lattices, including adding to the lattice points a different random shift to generate a randomly shifted lattice, thereby to attenuate aliasing over the pixels; and de-randomizing the random shifts per pixel by determining a shift per pixel by elements of a low discrepancy point set or a deterministic point set with maximized minimum distance, with stratification that matches the pixels;

wherein the stratification is induced by the Voronoi diagram of a rank-1 lattice.

3. In a computer graphics system including a processor, a display device, user input elements, and one or more memory elements, the computer graphics system being operable to generate images displayable via a display device, the images representing a scene and comprising a plurality of pixels, a computer-implemented system for generating a pixel value for a pixel in an image displayable via the display device, the pixel value being representative of a point in a scene, the system comprising:

means for generating a set of sample points, at least one sample point being generated using at least one sample, the at least one sample comprising at least one element of a sequence, and wherein the generating comprises adaptively sampling by using radical inversion-based points;

means, in communication with the means for generating a set of sample points, for evaluating a selected function at one of the sample points to generate a value, the generated value corresponding to the pixel value, the pixel value being usable to generate a display-controlling electronic output;

wherein a pixel is deemed refined whenever a refinement criterion is met, and wherein the refinement criterion can include comparing the image gradient against a predefined threshold T; and means, in communication with the means for generating a set of sample points, for selecting a value, for an exponent for a coefficient to be multiplicatively applied to the threshold T, to enable adaptation to the speed of convergence, wherein the coefficient is the sampling rate.

4. A computer program product for use in a computer graphics system, for enabling the computer graphics system to generate a pixel value for a pixel in an image displayable via a display device, the pixel value being representative of a point in a scene, the computer program product comprising a computer-readable medium having encoded thereon:

computer-readable program instructions executable to enable the computer graphics system to generate a set of sample points, at least one sample point to be generated using at least one sample, the at least one sample comprising at least one element of a sequence and the generating of a set of sample points comprising adaptive sampling by using radical inversion-based points; and computer-readable program instructions executable to enable the computer graphics system to evaluate a selected function at one of the sample points to generate a value, the generated value corresponding to the pixel value, the pixel value being usable to generate a display-controlling electronic output;

wherein a pixel is deemed refined whenever a refinement criterion is met, and wherein the refinement criterion can include comparing the image gradient against a predefined threshold T; and computer-readable program instructions executable to enable the computer graphics system to select a value, for an exponent for a coefficient to be multiplicatively applied to the threshold T, to enable adaptation to the speed of convergence, wherein the coefficient is the sampling rate.

5. In a computer graphics system including a processor, a display device, user input elements, and one or more memory elements, the computer graphics system being operable to generate images displayable via a display device, the images representing a scene and comprising a plurality of pixels, a computer-implemented system for generating a pixel value for a pixel in an image displayable via the display device, the pixel value being representative of a point in a scene, the system comprising:

means for generating a set of sample points, at least one sample point being generated using at least one sample, the at least one sample comprising at least one element of a sequence, wherein the generating includes sampling by using rank-1 lattice points;

means, in communication with the means for generating a set of sample points, for evaluating a selected function at one of the sample points to generate a value, the generated value corresponding to the pixel value, the pixel value being usable to generate a display-controlling electronic output;

means, in communication with the means for generating a set of sample points, for applying anti-aliasing by lattices, including adding to the lattice points a different random shift to generate a randomly shifted lattice, thereby to attenuate aliasing over the pixels; and means, in communication with the means for generating a set of sample points, for de-randomizing the random shifts per pixel by determining a shift per pixel by elements of a low discrepancy point set or a deterministic point set with maximized minimum distance, with stratification that matches the pixels;

wherein the stratification is induced by the Voronoi diagram of a rank-1 lattice.

6. A computer program product for use in a computer graphics system, for enabling the computer graphics system to generate a pixel value for a pixel in an image displayable via a display device, the pixel value being representative of a point in a scene, the computer program product comprising a computer-readable medium having encoded thereon:

computer-readable program instructions executable to enable the computer graphics system to generate a set of sample points, at least one sample point being generated using at least one sample, the at least one sample comprising at least one element of a sequence, wherein the generating includes sampling by using rank-1 lattice points;

computer-readable program instructions executable to enable the computer graphics system to evaluate a selected function at one of the sample points to generate a value, the generated value corresponding to the pixel value, the pixel value being usable to generate a display-controlling electronic output;

computer-readable program instructions executable to enable the computer graphics system to apply anti-aliasing by lattices, including adding to the lattice points a different random shift to generate a randomly shifted lattice, thereby to attenuate aliasing over the pixels; and computer-readable program instructions executable to enable the computer graphics system to de-randomize the random shifts per pixel by determining a shift per pixel by elements of a low discrepancy point set or a deterministic point set with maximized minimum distance, with stratification that matches the pixels;

wherein the stratification is induced by the Voronoi diagram of a rank-1 lattice.

* * * * *